Figure 23:
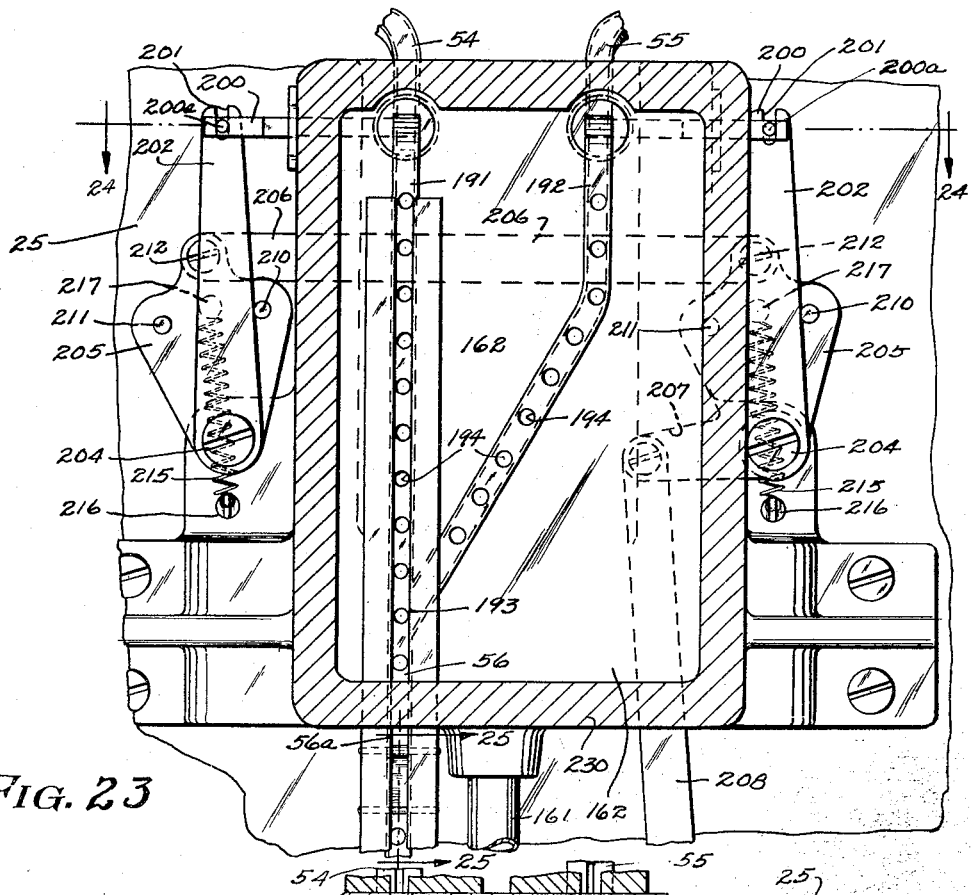

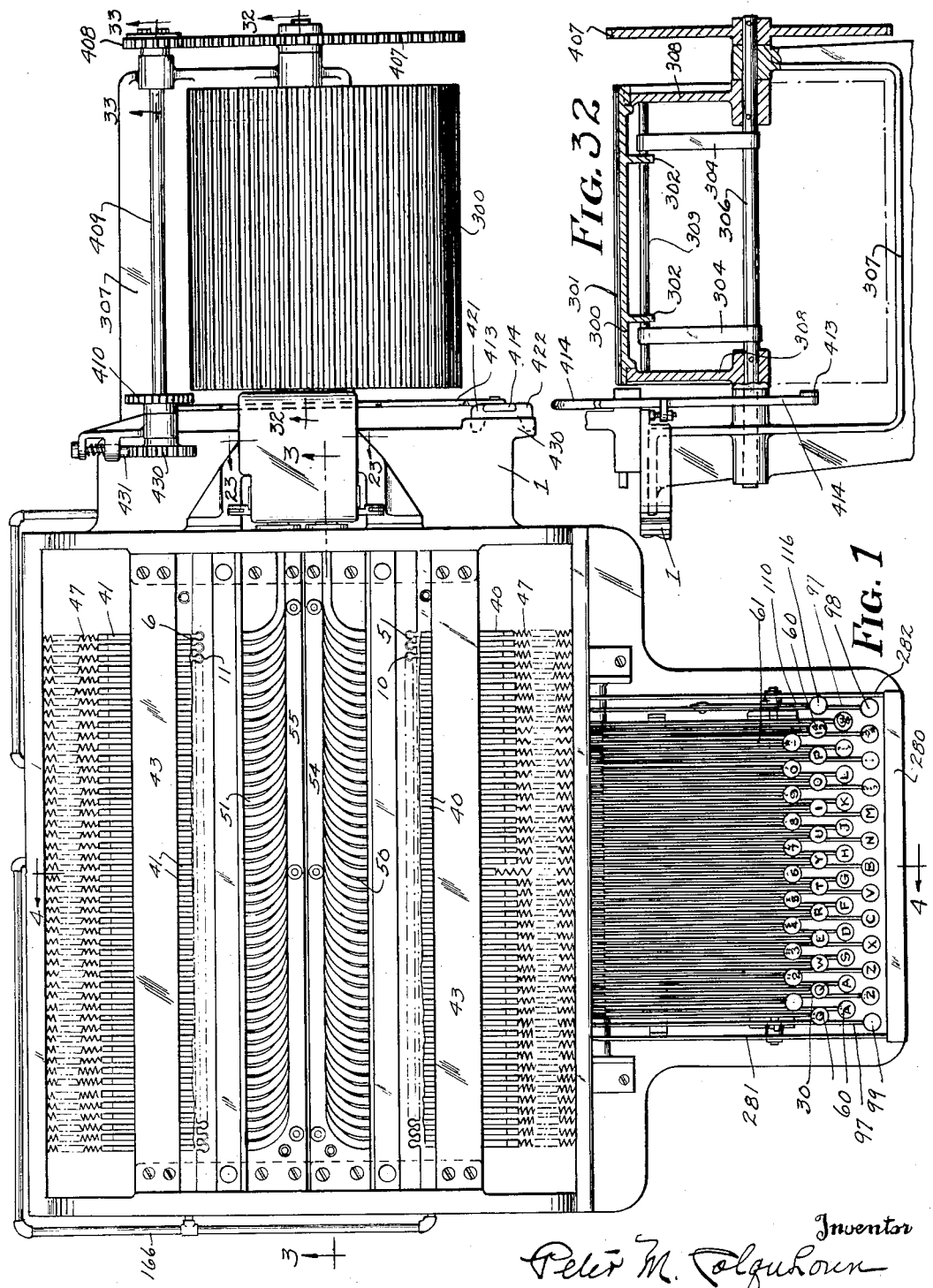

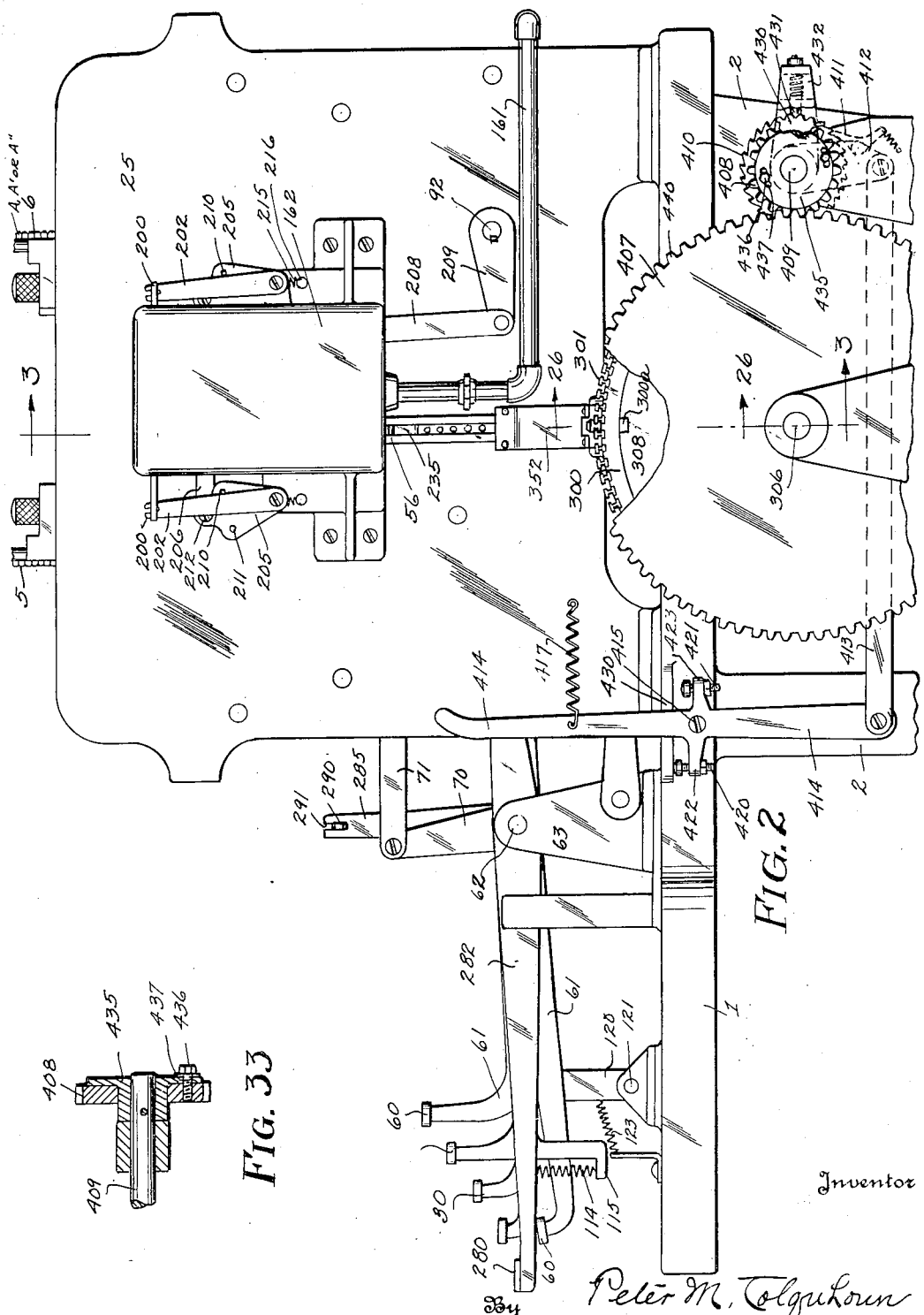

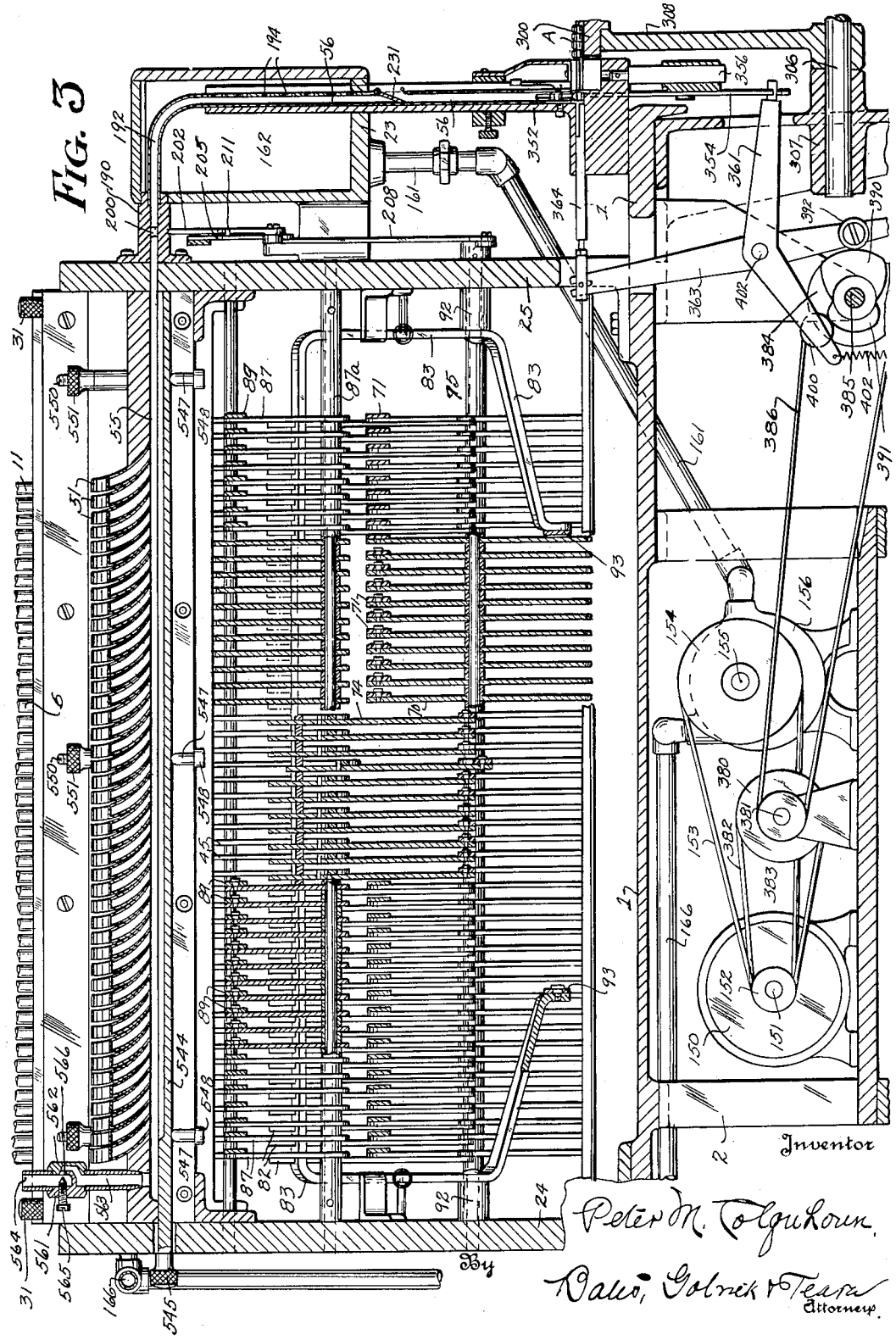

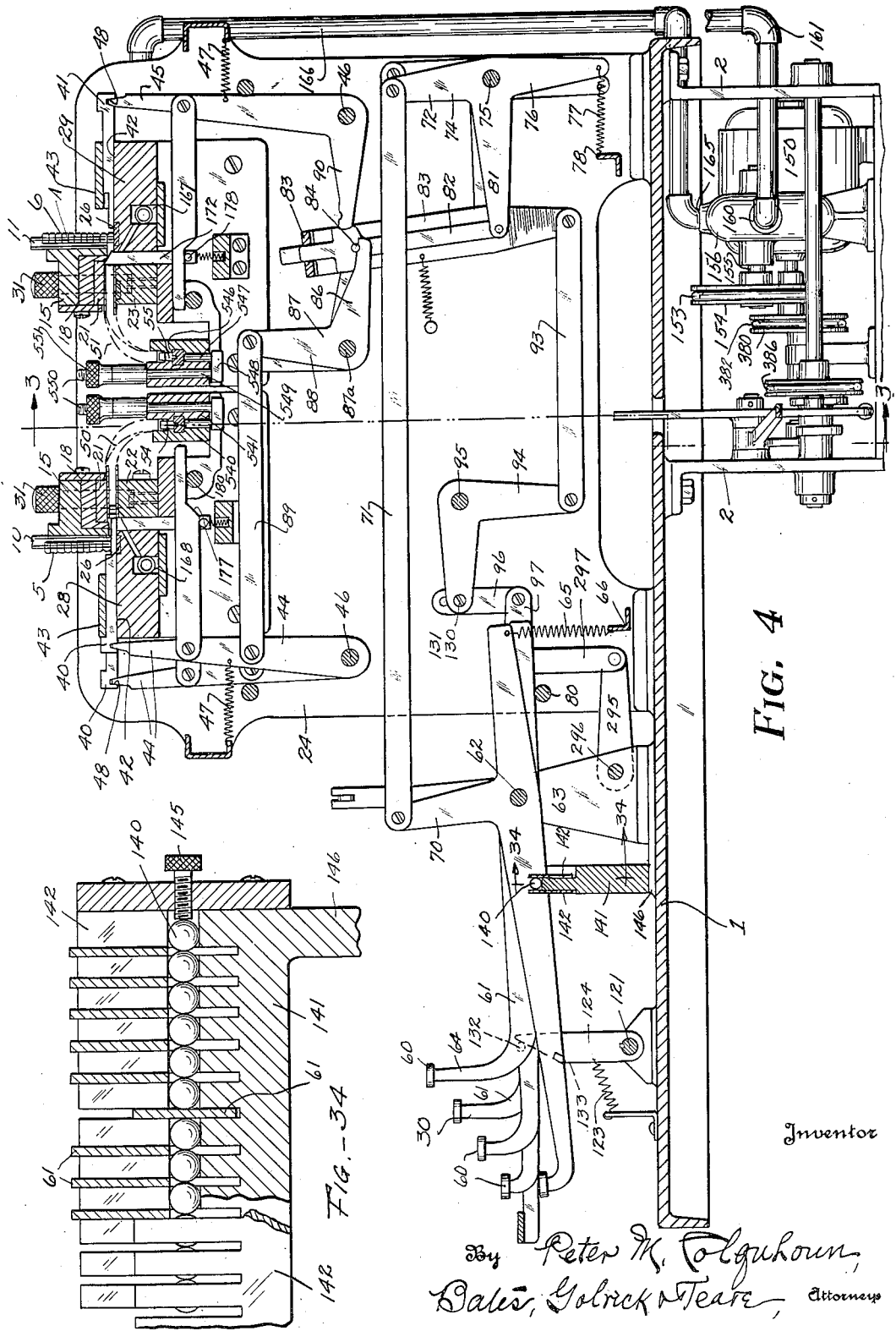

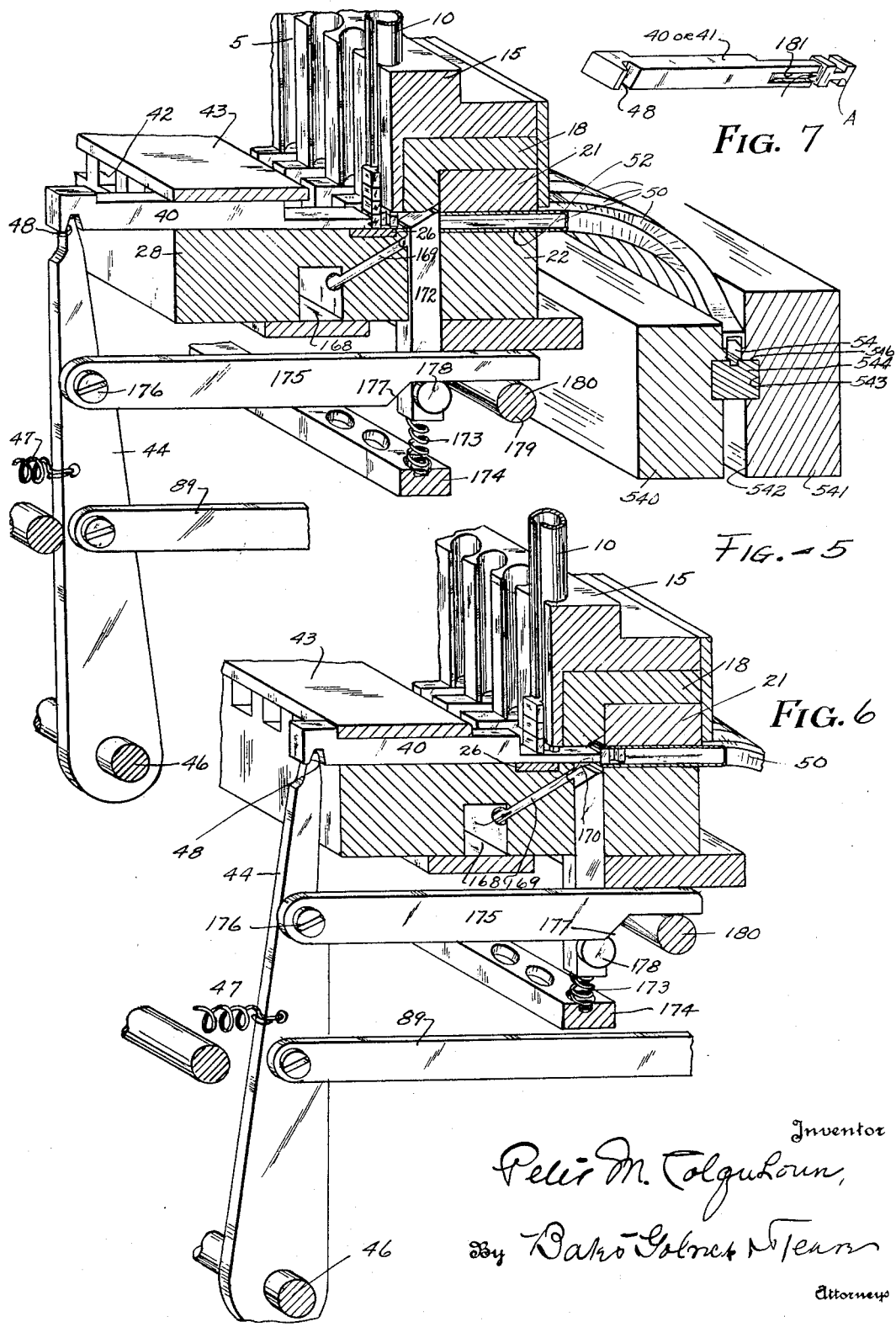

May 8, 1934.  P. M. COLQUHOUN  1,957,444
TYPESETTING MACHINE
Filed Aug. 18, 1931   12 Sheets-Sheet 6
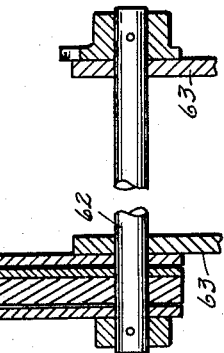
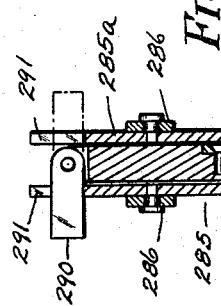
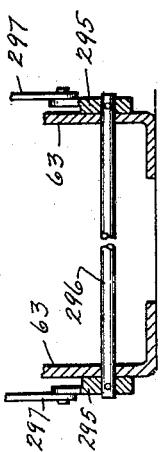
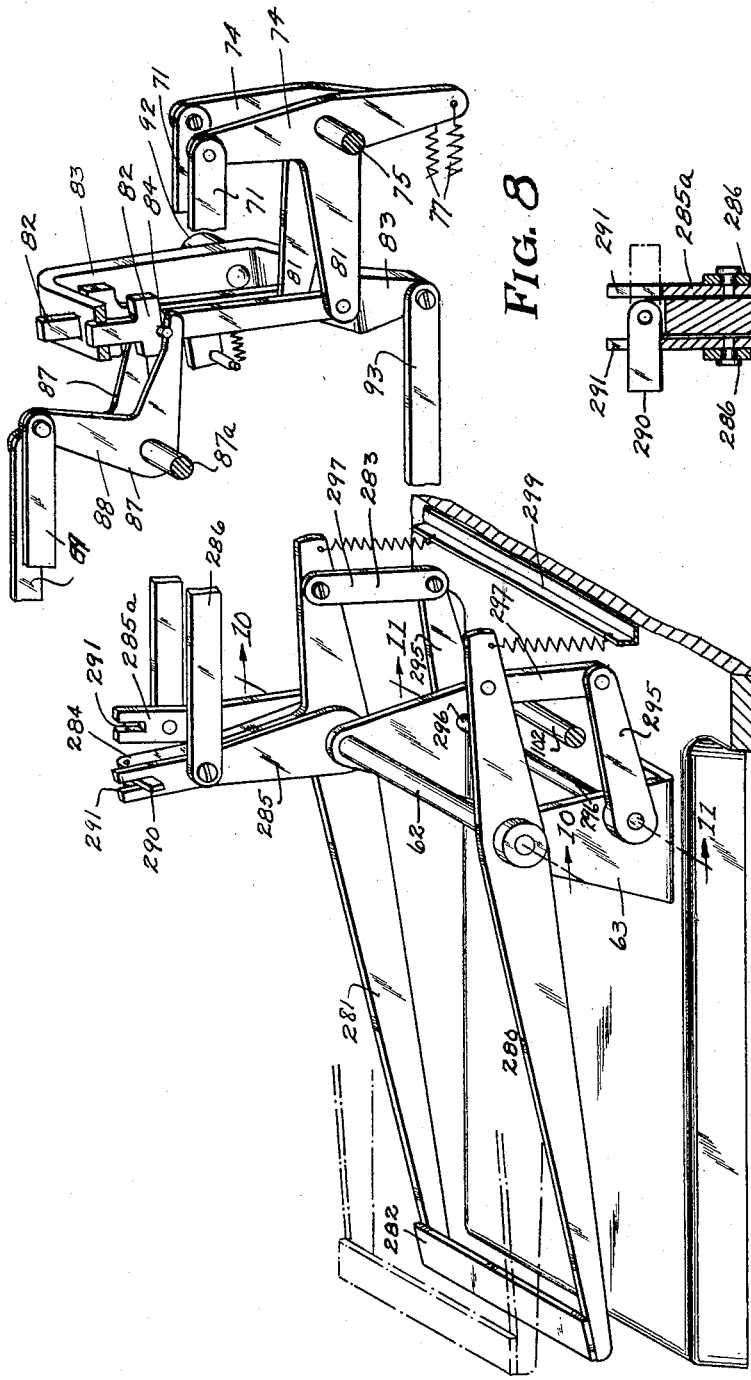
Inventor
Peter M. Colquhoun,
By Bates, Gobrick & Tear
Attorneys

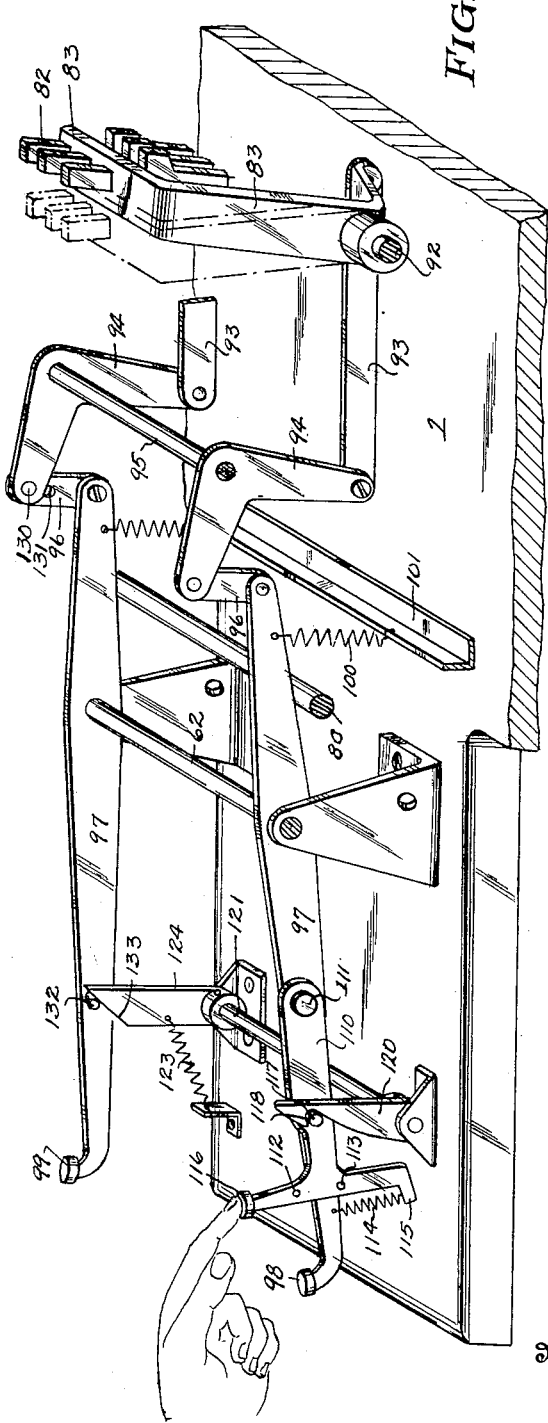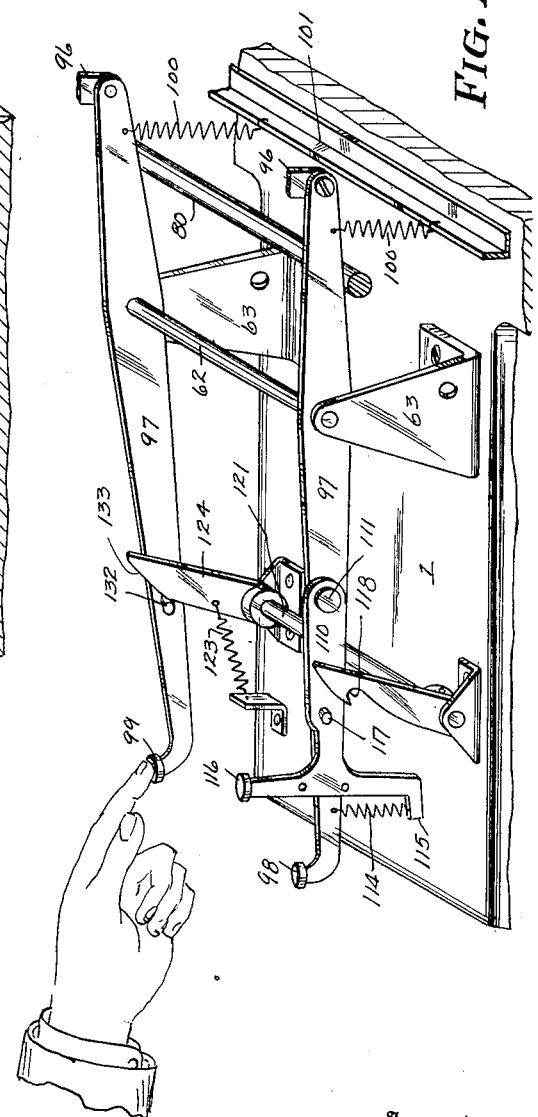

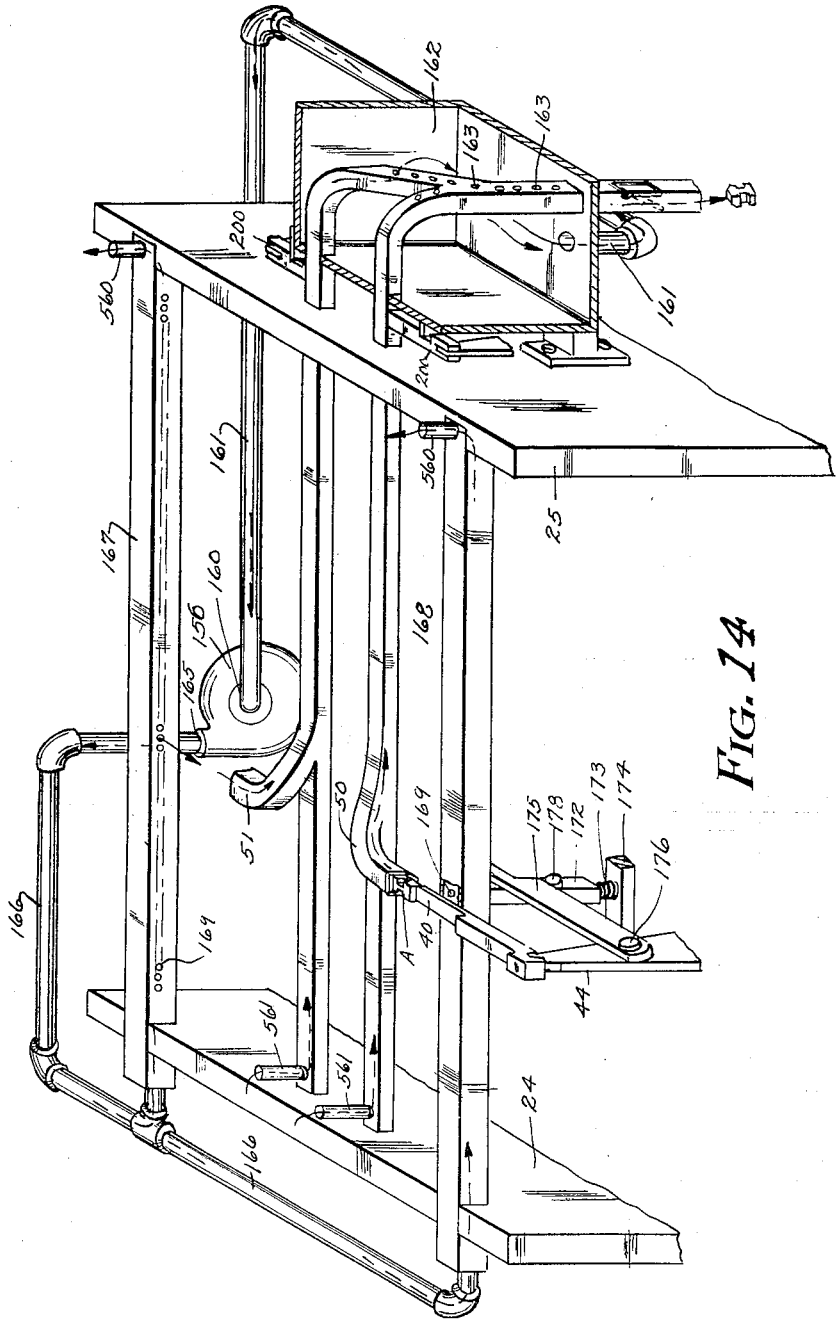

May 8, 1934.  P. M. COLQUHOUN  1,957,444
TYPESETTING MACHINE
Filed Aug. 18, 1931   12 Sheets-Sheet 9
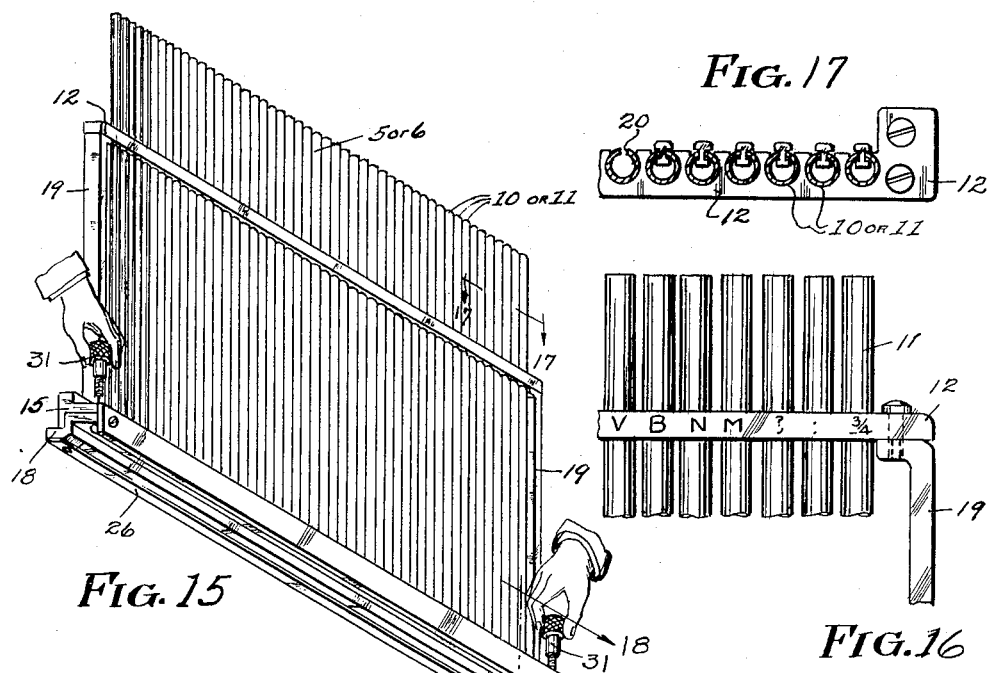
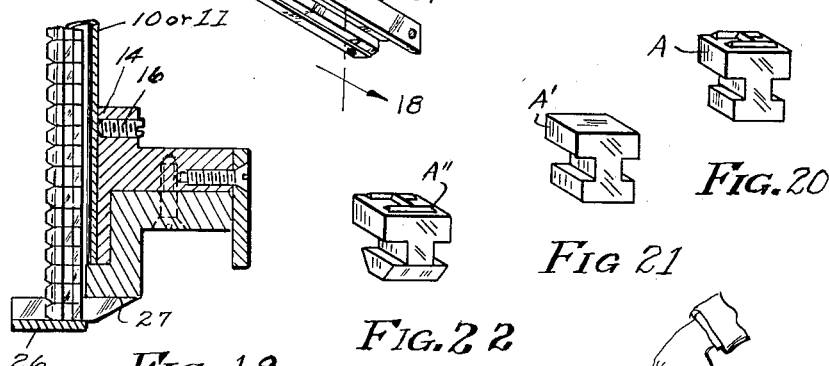
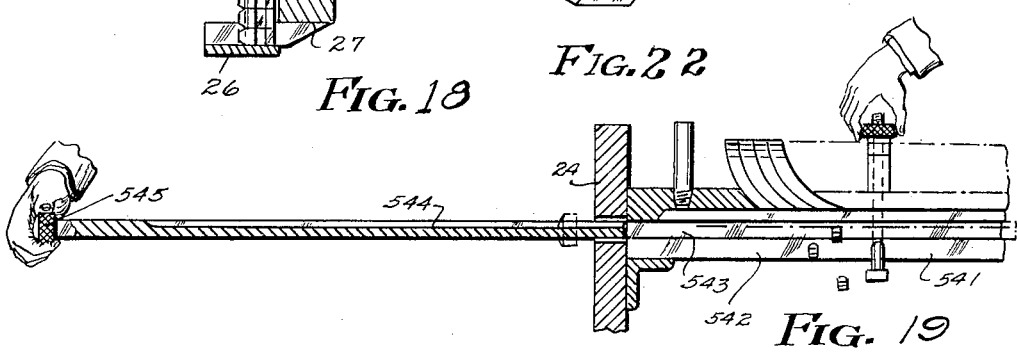

May 8, 1934. P. M. COLQUHOUN 1,957,444
TYPESETTING MACHINE
Filed Aug. 18, 1931 12 Sheets-Sheet 11

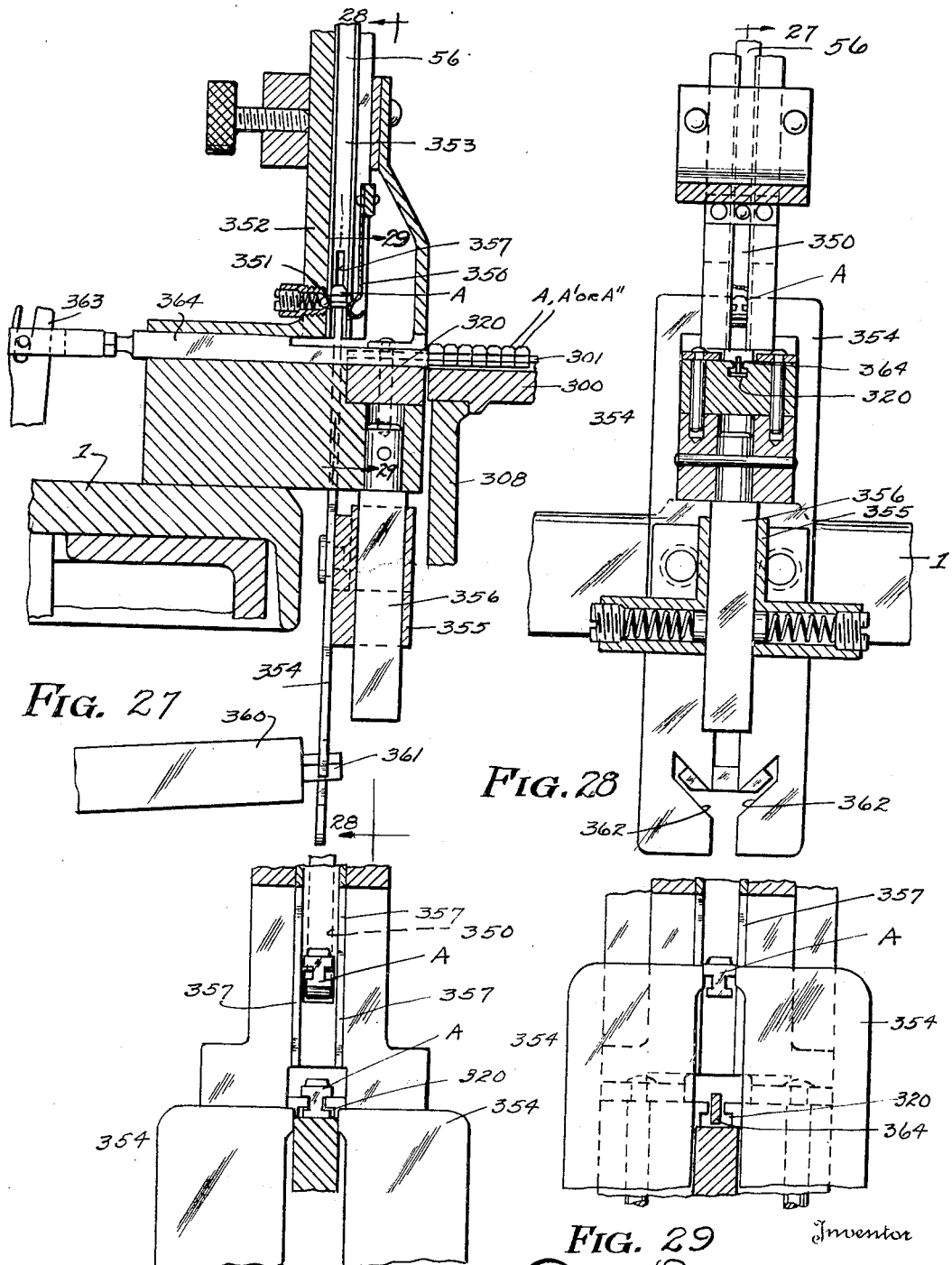

Patented May 8, 1934

1,957,444

UNITED STATES PATENT OFFICE

1,957,444

TYPESETTING MACHINE

Peter M. Colquhoun, Lakewood, Ohio, assignor to Multigraph Company, Wilmington, Del., a corporation of Delaware Application August 18, 1931, Serial No. 557,845

64 Claims. (Cl. 276—15)

This invention relates to a keyboard operated typesetting machine, and especially to a type setting machine arranged to enable the assembly of small short grooved type, such as is commonly used in a multigraph. The type are preferably assembled directly onto a parallel ribbed chase, for instance a ribbed drum or segment which may thereafter be installed in a multigraph and used, in connection with a suitable platen, to effect printing. Ease of operation, together with the comparative simplicity of structure, are objects of the present invention.

One of the features of the present invention is the provision of a mechanism which will eject the type from a storage position and convey such type to a discharge channel, from whence they are fed to a printing form, such mechanism being arranged so that it will operate to convey the type to said discharge channel at a high rate of speed, such as will be faster than the rate of speed the operator will use to select type by the usual keyboard, and thereby prevent the transposition of characters.

A further object of the invention is the provision of a novel valve arrangement, whereby the type may be progressed from the storage position to the discharge position, by means of variations of air pressures.

Other objects of the invention, contributing to the efficiency of the complete operation of the machine, will be apparent from the following description, which refers to a preferred embodiment of the invention illustrated in the drawings, and the essential, novel features thereof will be summarized in the claims.

Figure 25:
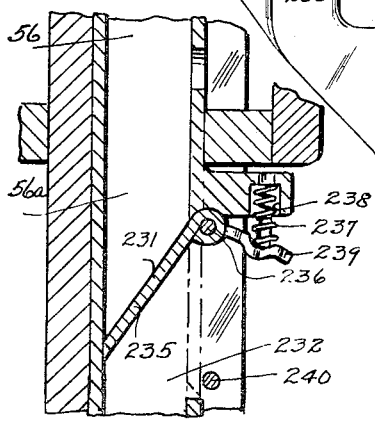
Figure 24:
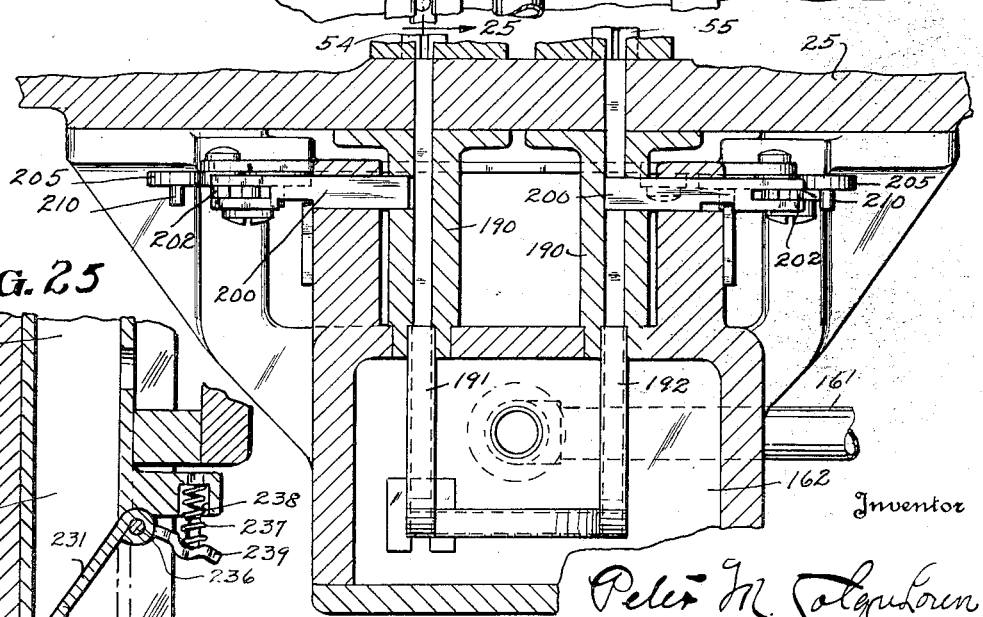
Figures 26, 31:
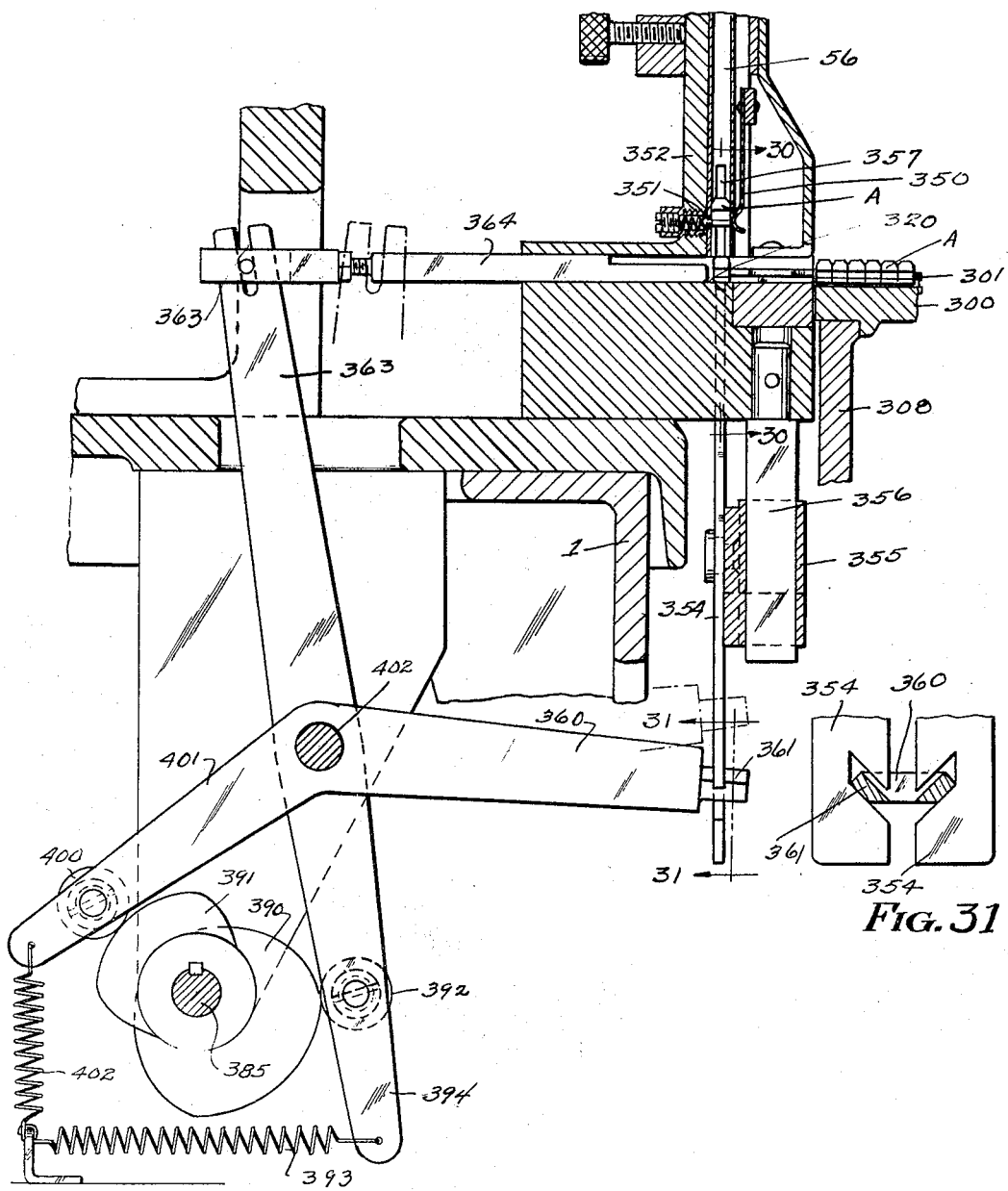

In the drawings, Fig. 1 is a plan of my improved type setting machine; Fig. 2 is an end elevation of the type setting machine, looking at a right-hand end of Fig. 1; Fig. 3 is a transverse section through the machine, and is taken substantially along the lines 3—3 in Figs. 1, 2 and 4; Fig. 4 is a longitudinal section through the machine as indicated by the lines 4—4 on Fig. 1; Fig. 5 is an enlarged sectional detail, illustrating a portion of the mechanism for ejecting the type from the storage position; Fig. 6 is a view similar to Fig. 5, but illustrating some of the parts in a different position; Fig. 7 is a perspective view illustrating an ejecting plunger in detail; Fig. 8 is a perspective view illustrating, in detail, a portion of the operating levers; Fig. 9 is a perspective view illustrating the lever mechanism, which operates to eject selected type from the storage channels; Figs. 10 and 11 are sections, as indicated by the lines 10—10 and 11—11, respectively, on Fig. 9; Fig. 12 is a perspective view illustrating the shift mechanism; Fig. 13 is a perspective view similar to Fig. 12, but illustrating certain of the parts in a different position; Fig. 14 is a perspective view diagrammatically illustrating the air pressure conduits; Fig. 15 is a perspective view illustrating the manner of removing the type banks; Fig. 16 is an enlarged detail of a portion of a type bank; Figs. 17 and 18 are enlarged sectional details of the type bank assembly, the plane of the sections being indicated by the lines 17—17 and 18—18 on Fig. 15; Fig. 19 is a detail partly in section, illustrating the manner of cleaning the type channels; Figs. 20, 21 and 22 are enlarged perspective views illustrating forms of type for which my machine is specifically constructed; Fig. 23 is an enlarged sectional detail of the type delivering channel, as indicated by the lines 23—23 on Fig. 1; Fig. 24 is a section through the type delivery channel as indicated by the lines 24—24 on Fig. 23; Fig. 25 is an enlarged sectional detail of an air valve arrangement, as indicated by the lines 25—25 in Fig. 23; Fig. 26 is an enlarged sectional detail, as indicated by the lines 26—26 on Fig. 2; Fig. 27 is a section taken in substantially the same plane as Fig. 26, but illustrating some of the parts in a different position; Figs. 28 and 29 are sectional details, as indicated by the lines 27—27 and 28—28, respectively, on Fig. 27; Fig. 30 is a sectional detail, on an enlarged scale, the plane of the section being indicated by the lines 30—30 on Fig. 26; Fig. 31 is a detailed section, on an enlarged scale, the plane of the section being indicated by the lines 31—31 on Fig. 26; Fig. 32 is a section through a multigraph segment and a portion of the discharge mechanism, the plane of the section being indicated by the lines 32—32 on Fig. 1; Fig. 33 is a detailed section, on an enlarged scale, as indicated by the lines 33—33 on Fig. 1; Fig. 34 is a detail of a device for preventing the depression of two key-actuated levers at the same time, being a section as indicated by the lines 34—34 on Fig. 4.

The main frame of my complete machine includes a bed or frame 1, which is supported on suitable legs 2. The frame is arranged to support an upright duplex type case having channels apportioned to the different type characters and is equipped with type ejecting plungers. Supported in the base of the frame is the operating motor, together with a suitable pressure pump, which operates to force the type through the various type channels. The frame also supports a removable multi-channeled type holder, in which successive lines of type are assembled into a chase form suitable for printing, by a power ejecting mechanism, which transfers the type from a receiving channel to such type holder.

The type cases 5 and 6, in which the type are stored, are best shown in Figs. 1, 2, 3, 4, 5, 15, 16, 17, 18 and 19. Each type case 5 or 6 comprises a series of parallel, upright tubes, 10 and 11, each having an open longitudinal slot therein. Suitable cross members 12, near the top of the tubes, and cross members 15, near the bottom thereof, are secured to the back of the channels or tubes. These tubes are preferably cylindrical in cross section, as illustrated in Fig. 17, and occupy cylindrical grooves in the cross members. The tubes are retained in position in the cross members by set screws 16, which are carried by the cross members and arranged to bear against the rear face of the tubes 10 or 11. The lower cross members 15 are secured to respective carriage plates 18, which, in turn, are provided with uprights 19, adapted to support the upper cross members 12. The front face of each tube 10 or 11 is slotted, as indicated at 20 in Fig. 17, the slots extending through the cross members 12 and 15.

I have thus provided a series of rigid, multi-channeled upright members, having grooves therein, whereby the edges of the channels adjacent the grooves are adapted to confine type, grooved at their opposite sides, such type being of the character indicated at A, A' or A'' in Figs. 17 to 22, inclusive. The cross member 15 of each type bank thus supports the tubes of that case as a unit, and is secured to a base 21. The bases 21 are secured at their ends to vertical frame plates 24 and 25 carried by the frame 1.

One of the type banks, for instance, the forward bank 5, is designed to carry lower case type; and the other bank 6 is designed to carry the corresponding upper case type. The type of the forward bank 5 faces the operator, while the type in the other bank 6 face toward the rear of the machine. The type are fed by gravity to the lower end of their cases, where they rest on a supporting plate 26, secured to respective bases 21, which are grooved on their bottom face, as shown at 27 in Fig. 18. The plane of the upper surface of the plate 26 is a continuation of the ejector plunger supporting surface of transversely extending bars 28 and 29, respectively, which bars are secured to the end plates 24 and 25.

Type are ejected from the plate 26 by suitable mechanism, operated by corresponding finger keys. The type are ejected from the front bank 5 rearwardly, and from the rear bank 6 forwardly. The key board 30, which operates the ejector plungers, is similar to that of a standard typewriter, and is provided with a shift key, enabling each key lever to print either of two characters. I provide shift mechanism whereby the same keys serve to eject characters from the front bank 5, or, when operated in conjunction with a shift lever, may operate to eject similar upper case characters from the rear bank 6. This will be hereinafter explained.

The arrangement of the type cases 5 and 6 is such that they may be readily removed and other cases, which may contain Elite type or Gothic type, may be substituted therefor. To this end, the type cases are removably mounted on the longitudinally extending bars 21, by means of set screws 31, which pass through the type case base and are arranged to secure the cases 5 and 6 to their respective bars 21.

The type are ejected from the channels 10 or 11 by individual plungers 40 and 41, which extend through the respective bars 28 and 29 and occupy grooves 42 in their respective base bars 28 or 29. Suitable plates 43 extend across the grooves outside of the type case proper, and complete the guides for the plungers. Each plunger 40 or 41 is engaged by a corresponding lever 44 or 45, the upper ends of which enter notches 48 on the underside of the plungers. The lower ends of the levers 44 and 45 are pivotally mounted on transversely extending rock shafts 46, carried by the end frame plates 24 and 25. The corresponding levers 44 and 45, and plungers 40 and 41, are constrained away from each other and the lowermost type in their respective type banks 5 or 6, by light tension springs 47, which tend to keep the plungers in their outermost positions, as shown by the plunger 41 in Fig. 4, and the plunger 40, in Fig. 5.

As soon as a plunger 40 or 41 is forced inwardly towards its respective type bank, the bottommost type in the channel, which was resting on top of its supporting plate 26, is thrust forwardly from said plate into a type receiving tube 50 or 51. In the embodiment shown, there is one tube 50 or 51 for each tube 10 or 11. One end of each of the tubes 50 or 51 is carried in slots 52 in bars 22 or 23 and covered by a closure plate such as the bars 21 heretofore mentioned, to complete the assembly. The other end of each channel 50 or 51 leads to a common delivery channel 54 or 55, depending upon the bank from which the plunger operates to eject the type. Thereafter, the type is forced through the channel 54 or 55 to the common delivery tube 56, by air pressures, as will hereinafter be described.

The arrangement of the tubes 50 and 51 is such that they guide the type on its side, foot first, turning the type through a 90° angle. The type therefore enter the channels 54 and 55 in the same relative positions that they enter the tubes 50 and 51.

The passageways 54 and 55, with which the tubes 50 and 51 communicate, are arranged to permit them to be readily cleaned. The side walls of these passageways are formed, as shown in Figs. 4 and 5, by longitudinally extending bars 540 and 541, which are rigidly secured to the end frame members 24 and 25. The tubes 50 or 51 are clamped, brazed or otherwise secured in series between the upper portions of said bars, thereby providing, in effect, a block having a longitudinally extending slot 542, the upper portion of which communicates with each tube 50 or 51. Spaced below the bottom of the tubes 50 or 51, a distance equivalent to the width of a type, is an enlarged or re-entry portion 543 of the slot. This re-entry portion of the slot extends longitudinally through the bars and through the end plate 24, as shown in Fig. 3. A closure bar 544 (Fig. 19) is slidably mounted in the slot and is provided with a knob or handle 545, so that it may be readily withdrawn from the slot, thereby permitting any dirt or type lodged therein to fall from the slot by gravity.

The closure bar 544 is preferably urged upwardly against shoulders 546 of the bars, thereby maintaining the passageways 54 and 55 airtight. As shown in Figs. 2 and 3, suitable pins 547 enter the slot and are arranged to engage the bottom surface of the bars 544. These pins are carried by horizontally extending bars or lugs 548, carried by vertically extending rods 549, which pass freely through the bars 541, and are provided on their upper portions with suitable threads 550 arranged to be engaged by clamping nuts 551, which are readily accessible from the top of the machine.

I will now describe the mechanism by which the depression of a finger key operates to rock the corresponding lever 44 or 45 to force a plunger 40 or 41 inwardly to eject a type from the corresponding type tube 10 or 11. The keyboard is similar to that found in the usual typewriter, and, as shown in Figs. 1, 2 and 4, comprises finger keys 60, which are attached to the outermost ends of respective key levers 61, pivoted intermediate their ends on a shaft 62, carried by vertical supporting brackets 63, secured, in turn, to the main frame 1. Each key 60 is rigidly secured to an upwardly extending portion 64 of a key lever 61, and is normally retained in an uppermost position by a spring 65, secured to the rearmost end of its respective lever 61, and to a bracket 66, carried by the end plates 25 and 26.

Each key lever 61 is provided with an upwardly extending arm 70, which is connected by a link 71 to an upper arm 72, of a three-armed lever 74, which is oscillatably mounted on a shaft 75, carried by the end frame plates 25 and 26. To the lower arm 76 of the lever 74 is secured a comparatively light spring 77, the other end of which is secured to a cross frame member 78. The spring 77 aids the spring 65 in retaining the lever mechanisms in their normal positions, wherein the finger keys 60 are raised and the upper ends of the lever 74 are in their rearmost positions.

The movement of the key levers 61, due to the action of the springs 65 and 77, is limited by a suitable stop bar 80, carried in the end frame members 24 and 25. Each lever 74 is provided with a forwardly extending arm 81, the outermost ends of which are pivotally connected to the lower ends of respective plungers 82. The plungers 82 are slidably mounted in an oscillatable yoke 83.

When the yoke 83 is in the position shown in Fig. 4, pins 84, which extend outwardly from each plunger 82, lie directly above the arms 86 of bell cranks 87, which are rockably mounted on a shaft 87a carried by the frame plates 24 and 25. Hence, the downward movement of the arm 81 of a lever 74, due to the depression of its respective key 60, will lower its associated plunger 82, causing the respective bell crank 87 to be oscillated or turned in a clockwise direction. Each bell crank 87 is provided with an upwardly extending arm 88, which is connected by a link 89 to its respective lever 44. The arrangement is such that a clockwise movement of the arm 88 of a bell crank 87 will cause its respective lever 44 to act on the corresponding plunger 40 and force a type from the type channel 10 with which that plunger co-operates.

When the yoke 83 occupies a rearward position, as shown in Fig. 12, the pin 84 corresponding to the key 60, which is depressed, will operate to draw the arm 90 of its respective bell crank 45 downwardly, oscilating that bell crank in a counterclockwise direction, and causing the respective plunger 41 to force the type from its corresponding type bank tube 11.

The yoke 83 may be shifted or moved from its forward to rearmost positions, so that the pin 84 will contact with either a lever 87 or 45, as desired, by means of a shift mechanism, heretofore mentioned, and best illustrated in Figs. 4, 12 and 13. Normally, the type setting machine is operated with the lower case type from the forward type channels 10, the depression of a key 60 serving to cause the plunger 82 to operate the forward bell cranks 87, which are operatively connected so as to eject lower case type from the storage channels 10. The shift mechanism brings the plungers 82 into a position where the depression of a key 60 will cause the corresponding plunger 82 to contact with its respective bell crank 45, automatically bringing the rear type case 6 into action.

The yoke 83 is in the form of a bale, pivoted at its ends, as at 92, to the upright frame plates 24 and 25. Secured to opposite ends of the bale 82, are links 93, which connect the bale to a bell crank 94 pivotally mounted on a cross bar 95, carried by the end frame plates 24 and 25. One arm of each bell crank 94 is connected by a link 96 to an operating lever 97, similar to the levers 61, and pivoted on the shaft 62, heretofore described. The levers 97 extend some distance forward of the shaft 62, to a position conveniently located relative to the keys 60, and are provided with suitable keys 98 and 99, respectively. As shown in Fig. 12, there are two such levers 97, one being located at each end of the key bank, in positions where the operator may use either one or the other, depending upon which is most convenient.

The shift mechanism is such that it may be operatively locked in position to retain the yoke 83 in a position where the plungers 82 will coact with the bell cranks 45. Normally, the depression of either key 98 or 99 operates to swing the yoke; however, the release of the key 98 or 99, springs 100 act on the levers 97 to immediately return them to their normal positions. The opposite ends of the springs 100 are connected, as shown in Figs. 12 and 13, to respective levers 97 and a frame member 101. The upward movement of the key levers 97 is restricted by the stop bar 80, which coacts with the lower edge of the rearmost ends of such levers.

The mechanism, which permits the shift mechanism to be retained in its rearmost position, is best illustrated in Figs. 12 and 13. As shown, the shift locking mechanism comprises a lever 110, pivoted at 111, to one end to the right-hand shift lever 97. The lever 110 is T-shaped and is provided with a pair of inwardly extending pins 112 and 113, adapted to lie respectively above and below the lever 97. Normally, the lower pin 113 contacts with the lower edge of the lever 97, by reason of a tension spring 114, one end of which is secured to an outwardly extending ear 115 of the lever 110, and the other end of which is secured to the lever 97. The upper arm of the lever 110 is provided with a key 116, which, when depressed, causes the pin 112 to contact with the upper edge of the lever 97. The spring 114 is considerably lighter than the spring 100, which acts to hold the lever 97 in its normal position.

When the key 98 is depressed, it first causes the pin 112 to contact with the upper surface of the arm 97, as heretofore described, and then causes both the right-hand lever 97 and the lever 110 to be depressed simultaneously. As the lever 110 is depressed, an outwardly extending pin 117, carried by the lever 110 is engaged by a notch 118 in a latch 120, which is rigidly secured to a rock shaft 121, mounted in bearing brackets 122, carried by the frame 1. The latch 120 is normally swung into contact with the pin 117 by a tension spring 123. One end of the spring 123 is secured to a lever 124, rigidly secured to the opposite end rock shaft 121, adjacent the other shift lever 97. Hence, when the key 116 is released, the pin 117 will be retained by the latch 120, thereby causing the lever 110 to be retained in its lowermost position and the pin 112 of that lever will then retain the right-hand lever 97 in its lower position, thereby causing the bale to be locked in its rearmost position.

When it is desired to release the bale 83 so that it may return to its normal position, wherein the plungers 82 are in a position to engage the respective bell cranks 86 to bring the forward type case 5 into action, the left-hand key 99 is depressed. The lever 97, to which this key is attached, is so arranged that the depression of the key 98 of the right-hand lever 97 will not affect it. As shown, this is accomplished by providing a lost motion connection between the left-hand bell crank 94 and its corresponding link 96. This connection comprises, as shown in Fig. 12, a pin 130, carried by the bell crank 94 and coacting with a slot 131 in the link 96.

When the key 99 is depressed, a pin 132, carried by the left-hand lever 97, to which the key 99 is secured, acts upon a bevelled nose 133 of the lever 124, causing it to be cammed or rocked toward the rear, thereby simultaneously rocking the latch 120, freeing the pin 117, and permitting the spring 114 to draw the right-hand lever 110 into its uppermost position, in which position the pin 113 engages the lower surface of the lever 97. Thereafter, the release of the key 99 permits both levers 97 to return to their normal or forward positions, under the action of the springs 100. This returns the bale 83 to its forward position, and brings the forward type case 5 into action. The forward movement of the lever 104 and latch 120 is restricted by the normal action of the pin 132 on the lever 124, there being contact between the two parts at all times.

I provide mechanism preventing the depression of two keys at the same time. Such mechanism may readily comprise the well known expedient of a row of balls extending transversely across a set of levers, in a position so that any actuating lever 61 must pass between an adjacent pair of balls, and there being only space enough in the whole train of balls to accommodate one lever 61. This is illustrated in Figs. 2, 4 and 35. As shown, 140 indicates the balls, and 141 and 142 a container therefor, shown as comprising a grooved overhanging bar 141, and a pair of retaining plates 142. The plates 142 and bar 141 are slotted in their upper portions for the passage of each key lever 61. Suitable abutment screws 145 in the ends of the ball raceway adjust the total space between the balls.

The device just described is shown as carried by the frame 1, through suitable brackets 146, and is located directly beneath the ends of the levers 61, slightly forward of their pivots 62. When any such lever 61 is depressed, as indicated, in one instance, in Fig. 35, the aggregate space between the balls 140 is appropriated so that no other lever 61 may be depressed until such depressed lever has been returned. This effectively prevents the ejection of two type at a time.

It will be understood, from the description so far given, that whenever a key 60 of the type setting machine is depressed, it operates to cause a plunger 40 or 41 to withdraw a type from the corresponding type channel 10 or 11, moving the type into one of the raceways 50 or 51. The movement of each plunger 40 or 41 operates to throw into action suitable mechanism which completes the ejection and transfer of the type without requiring any further work on the part of the operator. The mechanism for accomplishing this will now be described.

In the particular embodiment illustrated, the power for the machine is derived from an electric motor 150, (Figs. 3 and 4). The armature shaft 151 of the motor 150 carries a suitable pulley 152, which, through the medium of a belt 153, drives a pulley 154 rigidly secured to the drive shaft 155 of a combined vacuum and force pump 156. The air pressure created by the pump 156 acts through suitable conduits, which are diagrammatically illustrated in Fig. 14, to draw air from in front of the ejected type and force it to the rear of the same, thereby rapidly conveying the type from its respective type channels to a common point of discharge.

When a type is forced from a tube 10 or 11 by its respective plunger 40 or 41, it is carried a slight distance by the plunger, and thereafter a valve opens and permits a blast of air to act on the rearmost end of the type (relative to the direction of travel), and acts to draw it through its respective channel 50 or 51 into the raceway 54 or 55.

The paths of the type and the actions of the various air currents on the type, are best illustrated, diagrammatically, in Fig. 14. The intake port 160 of the pump 156 is connected by a suitable tube or conduit 161 to a sealed box or vacuum chamber 162, through which the raceways 54 and 55 pass. Within the chamber 162 the raceways, which are tubular in form, are joined together and provided with suitable vents 163, through which the air is drawn from the raceways by the pump 156. This creates a partial vacuum in the chamber 162, the raceways 54 and 55, and the channels 50 and 51.

As heretofore described, the raceways 54 and 55 communicate with the series of channels 50 and 51 respectively, which serve to convey the type from their respective type banks 5 and 6 into the raceways. Hence, from the time a type enters a channel 50 or 51 a partial vacuum is constantly acting on its foremost end (relative to its direction of travel).

The compressed air, which acts on the rearmost face (relative to its direction of travel) of a selected type and forces it quickly into its respective channel 50 or 51, is also obtained by use of the pump 156. The outlet port 165 of the pump 156 is connected by a suitable conduit 166 to passageways 167 and 168 in the type case supporting members 28 and 29, respectively, and suitable ports 169 lead from such passageways to chambers 170 through which the type are shoved by the plungers 40 or 41.

Suitable valve mechanisms are provided to cause the air pressures, both positive and negative, to act upon the type only after a selected type has been ejected from its respective storage channel 10 or 11. As shown in Figs. 4 and 5, the passageways 167 and 168 are each provided with a series of passageways 169, which lead from each passageway 167 or 168 to the vertically extending slots or chambers 170, which are arranged to communicate with the entrance of respective tubes 50 and 51 and into which chambers type are shoved by their corresponding plungers 40 or 41. These slots or chambers 170 are normally occupied by reciprocating valve members such as the plungers 172, which serve to completely block the respective passageways 169.

When a key 60 is depressed, causing its respective plunger 40 or 51 to eject a type from the corresponding type channel 10 or 11, the plunger or valve 172, which cooperates with the chamber 170, corresponding to the plunger operated, is withdrawn, permitting the plunger 40 or 41 to act against the type and carry it through the chamber 170 to the entrance of its respective tube 50 or 51. The plungers 172 normally close the entrance to their respective channels 50 and 51, thereby retaining a partial vacuum therein. As one of the plungers 172 is withdrawn, as will be hereinafter explained, the vacuum in its respective channel 50 or 51 acts on the foremost face of the type (relative to its direction of travel) and carries it through it respective channel, and the blast of air from the corresponding passageway 169 acts as a booster to overcome the inertia of the type and start it rapidly on its journey.

As shown in the drawings, the valves 172 comprise plungers which are slidably mounted in the type case supports 28 and 29 and are normally urged into an uppermost position, blocking the passageways 169 and their respective entrances to the tubes 50 and 51 by compression springs 173. The springs 173 are mounted in transverse frame members 174 and secured at their opposite ends to the side frame plates 24 and 25.

The operating mechanism for the valves 172 is best shown in Figs. 4, 5, and 6. When a key 60 is operated to cause its respective plunger 40 or 41 to eject a type from the corresponding storage channel 10 or 11, one of a series of levers 175, pivotally secured as at 176 to respective levers 44 or 45, which operate the plungers 40 or 41 to cause a selected type to be ejected from a type bank 5 or 6, is urged forwardly. A cam surface 177 of each lever 175 is arranged to act on one of a series of pins 178 carried by respective plungers or valves 172, and cam that valve downwardly to open its respective passageway 170 and tube 50 or 51 so that both the blast of compressed air and the vacuum will act upon the selected type. The inner ends of the levers 175 preferably rest upon a bar 179. Hence the motion of such lever is substantially a reciprocating movement. The reaction due to the sliding action of the cam face 177 against the pin 178 is taken care of by the contact between such lever 175 and the lower surface of a cross frame member 180.

To prevent the plunger from restricting the action of the compressed air forced through the passageway 167 or 168 they are provided with slots on their bottom faces as illustrated at 181 in Fig. 7. The slots provide a passageway to bring the passageway 169 into communication with the rearmost face of the type (relative to its direction of travel).

When the key 60 is released, the levers 44 and 45 swing outwardly from each other, as heretofore described, thereby returning the respective levers 175 to their normal or withdrawn positions and permitting the springs 173 to return the valve members 172 to their normal positions, where they block the passageways 169 and the entrance to the tubes 50 and 51. This maintains the various pressures in the system and prevents such pressures from acting on type other than one which has previously been selected.

The arrangement of the air pressure is such that I depend more upon the vacuum created to draw the type through the channels than I do upon the action of the compressed air on the type, the latter pressure acting as a booster to overcome the inertia of the type by forcing it rapidly into its respective channel 50 or 51 and effecting a rapid delivery of the type to the ejecting mechanism.

There can be no transposition of the type ejector that is, they must reach the delivery tube in the order in which the keys are depressed, by reason of the fact that the type, once having been removed from their respective storage tubes 10 or 11, by their respective plungers 40 and 41, are carried to the common discharge channel, considerably faster than the operator can operate successive individual keys 60.

I find it desirable to provide means to regulate the amount of the pressures, both positive and negative, thereby preventing any back pressure in the pressure lines which would affect the vacuum lines. To this end I mount at the extreme end of the passageways 167 and 168 a needle valve 560 which may be opened to permit any excess pressure in the passageways to escape into atmosphere.

I likewise provide a similar pair of valves 561 located at the extreme ends of respective passageways 54 and 55, to maintain the vacuum constant by permitting the entrance of a certain amount of air from the atmosphere, thereby permitting the pump 156 to constantly draw air from the passageways 54 or 55, to maintain a pressure on the passageways 166, 167 and 168.

Both valves 560 and 561 are similar and are best illustrated in Figure 3. As shown these valves comprise a hollow body 562 connected by a conduit 563 with their respective passageways and by conduit 564 to atmosphere. A needle valve 565 threaded into the body is arranged to adjustably obstruct the passageway 566 through the valve body to regulate the passage of air therethrough.

By the arrangement just described, I find that I am able to maintain the pressures of the compressed air and the vacuum practically constant, and thereby obtain the most advantageous pressures possible to carry the type through the type passageways, as heretofore described.

As heretofore mentioned, the type setting machine is operated for the greater part of the time on the front bank 5 which contains the lower case letters. Therefore, I provide a valve mechanism which will act to restrict the pasageway 55 of the rear bank 6 and cut it off from communication with the vacuum chamber 167, thereby permitting a more efficient vacuum to be created within the chamber 162 and the passageway 54. I find it convenient to connect this valve mechanism in such a manner that it will operate simultaneously with the bale 83, which is swung to cause the depression of a key 60 to cause type to be ejected from the rear type bank 6, which preferably contains the upper case type.

Likewise, as shown in the drawings, I may provide two such shut-off valves, one for the channel 54 and one for the channel 55. The arrangement of these valves is such that when the bale is in position to cause type to be selected from the forward type bank 5, the valve mechanism will restrict the passageway 55 of the rear bank 6, and, when the bale is in position to select type from the rear type bank 6, the valve will be in position to restrict the channel 54 of the forward bank 5.

This valve mechanism is best illustrated in Figs. 2, 3, 14, 23 and 24. As shown in these figures, the passageways 54 and 55 pass through the end frame plate 25 into blocks 190. These blocks, in turn, communicate with tubes 191 and 192 which are joined at 193 to form the common delivery raceway 56. The tubes 191 and 192 communicate with the vacuum chamber 162 by means of openings 194 therein. Each block 190 is provided with a plunger or valve member 200, adapted to be moved in its respective block, to a position completely blocking or filling its respective passageway 54 or 55, as shown by the right hand plunger 200 in Fig. 24, or moved to a position opening its respective passageway 54 or 55, as shown by the left-hand plunger 200 in Fig. 24.

The operating mechanism for the valves or plungers 200 is controlled by the operation of the bale 83. As shown in Fig. 23, each plunger 200 is provided with a pin 200a at its outermost end. Each pin 200a is arranged to co-operate with respective slots 201 in levers 202, pivotally secured by suitable studs 204 carried by the frame plate 25. The levers 202 are arranged to be oscillated by plates 205, pivoted to the studs 204 and joined together at their upper ends by a common link 206. The rearmost plate 205 has a forwardly extending ear 207, pivotally connected by a link 208, to a lever 209 (Fig. 2), which is rigidly secured to the right-hand pivot pin 92 of the bale 83. This pin 92 extends through the end frame plate 25 and oscillates as a unit with the bale, causing both valves 200 to be simultaneously moved whenever the bale is swung to either of its positions. The valves therefore automatically close the passageway 54 or 55 which is not in use, depending upon the position of the bale 83.

It is desirable that the valve members 200 be operated at a comparatively high rate of speed, considerably higher than the normal operation of the shift mechanism by the operator of the machine. I therefore provide the plates 205 with spaced pins 210 and 211, which are positioned on opposite sides of a line drawn between their pivot pins 204 and the respective link pivots 212 and are arranged to engage the opposite edges of their respective levers 202 to cause the latter to be moved to shift its corresponding valve plunger 200.

Assuming the parts are in the position shown in Fig. 23, wherein the type are being drawn from the front type bank 5, the left-hand plunger 200 is in a withdrawn position. As the shift key 99 or 98 is operated to change the shift mechanism so that type will be ejected from the rear type bank 6, the link 208 rocks the plates 205 in a clockwise direction, causing the pins 210 to depart from the right-hand edges of the levers 243. When the plates have been withdrawn half way, a spring 215, connected at one end to a pin 216, carried by the plate 205 midway between the pins 210 and 211, and at the other end to a pin 217, mounted on the frame plate 25, passes the center of the pivot pin 204 and rapidly throws the plates 205 to their extreme right-hand positions, the pins 211 contacting with the left-hand edges of the levers 202. The opposite is true when the shift key is released.

For the purpose of setting quads for spaces, I prefer to provide a bar, similar to the usual space bar on a typewriter. This bar is located at the extreme forward portion of the key bank, and is so arranged that it may operate to eject quads from either of two type channels in each bank 5 or 6 as desired. This is best illustrated in Figs. 8 to 11, inclusive. Pivotally mounted on the outermost ends of the shaft 62 are a pair of levers 280 and 281, connected at their forward ends by a common operating bar 282, and at their rear ends by a parallel link movement 283. The depression of the space bar 282 causes an upwardly extending arm 284 of the left-hand lever 281 to rock a lever 285 pivotally mounted on the shaft 62 adjacent the left-hand arm 281, and which, through the medium of a link 286, serves to operate one of the bell cranks 87 to eject a quad from its respective tube 10 or 11.

The arrangement is such that I may use the space bar 282 to withdraw type quads from either of two or more channels, as desired, and such is the showing in the drawings. As shown, the upper end of the lever 284 is provided with a pivoted arm 290, which is arranged to engage notches 291 in either of two levers 285 or 285a, one of which operates through a linkage heretofore described to eject type from one channel, the other of which operates to eject type from another channel.

As the quad ejector control bar 282 extends practically the entire width of the keyboard and operates through mechanism located at one side thereof, it is found advantageous to provide a parallel link motion to aid in maintaining the bar 282 in a horizontal position, even though the operator should depress only one end thereof. For this purpose, I rigidly mount a pair of levers 295 on a common rock shaft 296, carried by the bearing brackets 63, some distance below the rock shaft 62. The outermost ends of the levers 295 are connected by suitable links 297 to the arms 280 and 281. Suitable springs 298, connected at one end to respective levers 280 and 281, and at their other ends to a frame member 299, serve to maintain the arms 280 and 281 in a normal position, where the cross bar 282 is raised, as shown in dotted lines in Fig. 9. In this position the rear ends of the levers 280 and 281 are in contact with the cross bar 102, heretofore described.

The type ejected from the type banks 5 and 6 by the keys 60 are forced and drawn by air pressures through the various passageways into the common discharge passageway 56, which extends through the base 230 of the vacuum chamber 162. Below the chamber 162 the passageway 56 continues as an extension 56a which constitutes a trap and is provided with a flapper valve 231, which prevents the pump 156 from drawing air upwardly through such passageway into the chamber 162. However, as type is drawn downwardly through the channel 56, they have sufficient momentum, due to gravitation and the action of the air pressures, to carry them downwardly through the trap, past the flapper valve 231, and into a passageway 232 from which they are discharged, in line formation, by a suitable ejecting mechanism, hereinafter to be described.

The flapper valve 231 (shown on enlarged scale in Fig. 25) comprises a relatively small, lightweight plate 235, pivoted at 236 to the frame of the passageway 56 and normally maintained in a position closing such passageway by a light compression spring 237, mounted in a recess 238 in the walls of the passageway, and arranged to act on an ear 239 of the flapper valve. A suitable pin 240, carried by the walls of the passageway, serves to limit the outward movement of the valve, due to its being hit by descending type.

I prefer to use, as the channeled receiving member or type chase, a standard multigraph rotary type segment, which, when filled with type in line formation, may be transferred directly to a printing machine. Such segment is shown, described and claimed in Patent No. 1,122,728, issued December 29th, 1914, to The American Multigraph Company, and is illustrated herein at 300, in Figs. 1, 2, 3, 26, 27 and 32. As there shown, it comprises substantially a semi-cylindrical segment or drum, having overhanging rails 301, and provided with internal transverse stiffening webs 302. Mounted in these webs is a rod 303, carrying spring hooks 304. In use in a multigraph the segment rests on two skeleton discs on a main shaft, and the springs 304 engage the shaft to hold the segment in place. In the present machine, I employ a somewhat similar arrangement of central shaft and supporting discs for holding the segment.

The support for the segment comprises a shaft 306 mounted in a suitable frame yoke 307, carried by the bed plate 1, and on this shaft within the yoke is provided two discs 308, which are pinned to the shaft. The type segment 300 rests on these discs and is temporarily locked thereto by the spring hooks 304 engaging the shaft 306.

As will be seen from Figs. 26 and 27, the left-hand end of the rail segment is in a plane close to the right-hand end of a channel 320, which lies in a plane at right angles to the passageway 56 and passes immediately below it, and is parallel with the rails of the segment. Any channel of the segment 300 may be aligned with the channel 320, as will hereinafter be described, and suitable mechanism is provided to eject the type which descend through the channel 56 outwardly from the channel 320 into the channels on the multigraph segment.

While any suitable mechanism may be employed to eject the type from the channel 56 onto the type segment 300, I may use that shown in detail in Figs. 26 to 31, inclusive. As illustrated in these figures, the type ejecting mechanism is so formed that it will normally operate to eject type from the channel 56 at a much higher rate of speed than a most skilled operator operates the keys 60. Hence, the channel 56 is ordinarily kept clear of type. As shown in Fig. 26, when a type drops through the channel 56, its downward movement is arrested by a flat spring 350, which urges the type inwardly against a spring pressed ball 351, carried in a suitable frame 352, in which the ejecting mechanism is mounted and which is secured to the frame 1 of the type setting machine.

It will be noted, as shown in Fig. 26, that the type are arrested some distance above the channel 320, which is formed in a block 352, as heretofore described, and then gripped and positively carried downward into the channel 320. The side walls 353 of the channel 56 are provided with slots 357 adjacent their lower edges, in which move a pair of levers 354. These levers are pivotally secured to a block 355, mounted for a vertical reciprocation on a guide 356, carried by the base 352 of the type ejector. The uppermost ends of the levers 354 extend inwardly and are adapted to, when the levers are in their uppermost positions, engage the sides of the type as indicated in Fig. 29. Thereafter, the levers are drawn downwardly by a bell crank 360. The bell crank is provided with oppositely bevelled noses 361, arranged to engage slots 362 in the lower ends of the respective levers 354. Hence, when the bell crank 361 is rocked to draw the levers 354 downward, it simultaneously forces the upper edges of these levers inwardly to engage the type casing as shown in Fig. 29, and carrying it positively downward, through the grip of the springs 350 and the spring pressed ball 351, to a position where such type rests in the channel or raceway 320, heretofore described.

As soon as the levers 354 have reached their lowermost position, they are maintained there by a cam, hereinafter to be described, and a plunger 364, reciprocably mounted in the channel 320 of the base 452, is thrust forwardly by a lever 363, shoving the type forward out of the channel 320 and into the channel of the multigraph segment 300. The arms or levers 354 are then raised by an upward movement of the lever 361, the cam surfaces 361 thereon acting on the slots 362 in the levers 354 to spread them apart and position them to grip the next succeeding type.

The type, as heretofore described, are momentarily arrested by the spring 350 and the spring pressed ball 352; hence, it is not necessary that the operating mechanism for the levers 361 operate in a specific timed relationship relative to the operation of the keys 60 or their associated mechanisms. However, it is highly desirable to operate the levers 361 at a higher rate of speed than is possible for an operator to depress the consecutive keys 60 to eject selected type from the type banks 5 or 6 into the passageway 56.

As shown in the drawings, the type ejector is driven by the motor 150 heretofore described. This drive is best illustrated in Figs. 3 and 26. As shown, it comprises a pulley 380, rigidly mounted on a shaft 381 and driven by means of a belt 382 from the driving pulley 380 which is secured to the armature shaft of the motor 150. A second pulley 383 is secured to the shaft 381, and drives the pulley 384 mounted on a shaft 385 through the medium of a belt 386. The arrangement of pulleys is such that the shaft 385 is driven at a comparatively high rate of speed.

Rigidly secured to the shaft 385 are a pair of cams 390 and 391. The cam 390 acts on a roller 392, which is secured to the lever 371. A suitable spring 393, secured at one end to the arm 394 of the lever 363, serves to maintain the roller 392 in contact with the surface of the cam 390. The cam 391 coacts with a roller 400 secured to an arm 401 of the lever 361. A suitable spring 402, secured at one end to the lever arm 401 and the other end to a stationary part of the machine and serves to maintain contact between the cam 391 and the roller 400. For convenience, both levers 361 and 363 are pivotally mounted intermediate their ends on a common shaft 402, carried by a downwardly extending ear of the main frame 1.

The mechanism for advancing the segment, step by step, to present consecutive rails to the channel 320 is best illustrated in Figs. 1, 2, 32 and 33. The multigraph railed segment or drum 300, as heretofore described, is carried by end plates 308 carried by the shaft 306. These end plates are provided with slots arranged to coact with lugs 300a, rigidly carried by the multigraph segment 300 and which serve to align the segment relative to the shaft 306. Rigidly secured to the shaft is a toothed gear 407, arranged to mesh with a gear 408, carried by a counter-shaft 409, journalled in suitable bearings carried by the frame member 307. Rigidly secured to this shaft 409 is a ratchet wheel 410, arranged to be engaged by a spring pressed pawl 411, carried by a lever 412, pivotally mounted on the shaft 409, and connected by a link 413 to a lever 414, pivotally mounted as at 415 to the frame or base 1 of the machine.

The arrangement just described is such that when the upper end of the lever 414 is drawn forward by the operator against the action of a spring 417, it causes the pawl to advance the ratchet an amount substantially equal to the distance between rails 301 of the segment.

To precisionize the stroke of the mechanism above described, I provide the means shown in Fig. 2, comprising a pair of set screws 420 and 421, carried by transversely extending arms 422 and 423, respectively, of the lever 414. The heads of these screws are arranged to coact with an ear 430, which extends outwardly from the main frame of the machine and positively limits the distance of travel of the lever 414.

I also provide means to prevent the ratchet mechanism from overthrowing, which comprises a toothed index wheel 430, rigidly secured to the shaft 409 and the teeth of which are arranged to be engaged by a spring pressed plunger 431, carried by a rigid frame member 432. An attachment is likewise provided so that the rails of one segment may be positively aligned with the channels 320. I find this is easily accomplished by adjustably mounting the gear 408 on the shaft 409, as shown in Figs. 1, 2 and 33. This adjustment comprises a disc 435, which is pinned to the shaft 409, and on which is loosely journalled the gear 408. The driving connection between the shaft and gear comprising a set screw 436, threaded into the gear 408, and passing through a slot 437 to the disc. Hence, the relative relation between the shaft and disc may be altered as desired. The relationship of the teeth 440 of the gear member 407 is preferably such that there is one tooth for each rail, thereby insuring absolute alignment.

My type setting machine, as herein described, embodying the principles of key-controlled plunger ejection of the individual type, pneumatic transportation of the same and mechanical control at the region of discharge, enables a very efficient, easily operated system of type setting. The type being small, and requiring only a short movement to release the bottom type from the column, this action requires a comparatively small amount of force, and may be readily effected, as herein, by plunger action mechanically connected directly to the key levers. The ordinary finger operation of the keyboard furnishes ample power for actuating the ejectors with the maximum of speed. The ejection of the type and the opening of the valve is the only manual work performed by the operator in assembling a line of type, since the pneumatic transportation follows automatically, and the force thereof, and also of the mechanical control of the type at the assemblage point, is supplied by the motor. The indexing of the receiving chase is effected by the simple operation of a lever, and when the form has been assembled in the chase, the latter is readily removed for direct use in the printing machine.

I claim:

1. The combination of a stationary channel adapted to receive individual type from various sources, of means to create a partial vacuum in such channel before such type, and means to cause compressed air to act against the opposite side of said type in the channel.

2. The combination of a type case having channels adapted to contain individual type, means to eject such type from the channels, a discharge passageway through which said type pass and arranged to be common to all of said type channels, of means to create a partial vacuum in such passageway before such ejected type to carry them through the passageway, and means to cause a blast of compressed air to act upon the type as they approach the discharge passageway.

3. The combination of a type case having channels adapted to contain individual type, of a keyboard controlled means to eject selected type from the channels, a discharge passageway through which the ejected type pass and arranged to be common to all ejected type, means to create a partial vacuum before such ejected type to carry them through the passageway, and means operative consequent upon the operation of the keyboard to cause a blast of compressed air to act upon the rear of said type and force them into the discharge passageway.

4. The combination of a type case having channels adapted to contain individual type, means to eject such type from the channels, a passageway into which the selected type are ejected, means to decrease the air pressure in the passageway in front of such ejected type, and means to increase the air pressure to the rear of such ejected type and thereby move them through the passageway.

5. The combination of a type case having channels adapted to contain individual type, means to eject selected type from the channels, a passageway into which the type are ejected, pneumatic means for moving the type along the passageway and a valve mechanism adapted to control such pneumatic action.

6. The combination of a type case having channels adapted to contain individual type, means to eject selected type from the channels, a passageway into which the type are ejected, means to decrease the air pressure before such ejected type, and a valve mechanism to normally prevent such decreased pressure from acting upon type.

7. The combination of a type case having channels adapted to contain individual type, of means to eject such type from the channels, a passageway into which the selected type are ejected, means to increase the air pressure to the rear of such ejected type, and a valve mechanism for controlling the rear of such ejected type, and the application of such increased air pressure.

8. The combination of a type case having channels adapted to contain individual type, means to eject selected type from the channels, a passageway into which the type are ejected, means to decrease the air pressure before and increase the air pressure at the rear of such ejected type, and a valve mechanism disposed between the type channel and the passageway arranged to normally prevent such decreased and increased pressures from acting upon type.

9. The combination of a type case having channels adapted to contain individual type, means to eject such selected type from the channels, a passageway into which the type are ejected, pneumatic means for progressing such ejected type along the passageway, valve mechanism to normally prevent such pneumatic action and means operatively connecting the valve mechanism to the type ejecting means.

10. The combination of a type case having channels adapted to contain individual type, means to eject selected type from the channels, a passageway into which the type are ejected, means to decrease the air pressure before such ejected type and/or increase the air pressure to the rear of such ejected type, a valve mechanism disposed between the type channel and the passageway and arranged to normally prevent such pressure from acting upon type, and means operatively connecting the valve mechanism to the type ejecting means.

11. The combination of a pair of type cases, individual means to eject type therefrom, key operated means for causing such ejecting means to function to eject a selected type, a pair of discharge passageways for the respective type cases, means to create a pneumatic action in such passageways, and a valve mechanism associated with one of said passageways and arranged to prevent pneumtic action therein.

12. The combination of a pair of type cases each comprising upright channels for individual type, individual means located at the bottom of each channel to eject type therefrom, key operated means for causing such ejecting means to function to eject selected type, independent discharge passageways for the type of each case and common to all of the type channels in respective type cases, means to create a partial vacuum in such passageways, and a valve mechanism associated with one of said passageways and arranged to prevent the vacuum from acting on such passageway when type are being ejected into the other passageway.

13. The combination of a pair of type cases each comprising upright channels for individual type, two opposed sets of plungers located individually at the bottom of the channels, key operated means for operating the plungers, a pair of independent discharge passageways, common to all of the type channels in the respective type cases, means to create a partial vacuum in such passageways, and a valve mechanism for said passageways arranged to prevent the vacuum from acting on one of the passageways when type are being ejected into the other passageway.

14. The combination of two type cases each comprising a series of channels arranged to contain individual type, two sets of mechanisms arranged to eject type from the cases respectively, two sets of operating mechanisms arranged to engage respective ejecting means, a settable actuating means to engage and move either set of operating mechanisms as desired, an individual discharge passageway for each type case, means to create a partial vacuum in said passageways to draw the ejected type therethrough and a settable valve mechanism associated with each passageway and arranged to cause such partial vacuum to act upon one of the passageways at a time.

15. The combination of two upright type cases one behind the other, two sets of plungers extending into the lower portions of the cases respectively, two sets of operating mechanism having upright arms engaging respective plungers and two sets of substantially horizontal arms projecting towards each other, a settable actuating means to engage and move either set of the latter named arms as desired, an individual discharge passageway for each type case, and means to cause the pneumatic pressure in such passageway to be greater on the rear side of the type than on the front side.

16. The combination of a type case having channels adapted to contain individual type, of a series of plungers arranged to eject type from the channels, passageways into which the type are ejected, pneumatic means for moving the ejected type along the passageway, a series of valves for controlling the pneumatic action, and mechanical connections between the valves and plungers.

17. The combination of a type case having channels adapted to contain individual type, a series of plungers arranged to eject type from the channels, an air compressor, a conduit for said compressed air arranged to cause the compressed air to act on the type before the plungers have completed their ejecting movement.

18. The combination of a type case, having channels adapted to contain individual type, of a series of plungers arranged to eject type from the channels, a conduit, means to produce a partial vacuum in said conduit, and wherein said conduit is arranged as to cause the partial vacuum to act on the type before the respective plungers have completed their ejection movement.

19. The combination of a type case having channels adapted to contain individual type, of a series of plungers arranged to eject type from the channels, an air compressor, a conduit for said compressed air, a second conduit, means to produce a partial vacuum in the second named conduit, and means whereby both of said conduits are arranged to cause the compressed air and partial vacuum to act on the type before the respective plungers have completed their ejection movements.

20. The combination of a type case having channels adapted to contain individual type, a series of plungers arranged to eject type from the channels, an air compressor, a conduit from the aforesaid compressed air, a second conduit, means to produce a partial vacuum in the last named conduit, and means whereby both of said conduits are arranged to cause the compressed air and partial vacuum to act on the type before its respective plunger has completed its ejection stroke, but wherein the arrangement is such that both of such pressures are prevented from acting on a type before its respective plunger has started its ejection stroke.

21. The combination of a type case comprising a series of channels arranged to contain individual type, of means to eject type therefrom, a raceway through which ejected type pass, comprising a slotted member open at its base, a closure for such opening, and means to release said closure member to permit cleansing of the raceway.

22. In combination with a type case comprising a series of channels arranged to contain individual type, means to eject type from such channels, a raceway through which the ejected type pass comprising a substantially solid block provided with a longitudinal passageway having a longitudinally extended re-entrant portion and a closure member removably mounted in such re-entrant portion.

23. In combination with a type case comprising a series of channels arranged to receive individual type, means to eject type from such channels, a raceway through which the ejected type pass comprising a longitudinally extending passageway bounded on its bottom by a longitudinally extended slidably mounted closure member and on which the type are arranged to slide, and means accessible from the top of the machine to lock the closure member in place or release it as desired.

24. The combination of two type cases, a set of type ejecting means for each case, one set of operating levers for such ejecting means, a yoke, a set of interponents carried by the yoke and arranged to be engaged by respective operating levers irrespective of the position of the yoke, a keyboard having finger keys for various characters, connections between the operating levers and the keys, each key of the keyboard serving for a character from each type case, a shift key to change from one character to the other, a connection between the shift key and the yoke to cause the selection of the type case to be made, two type receiving channels for receiving ejected type from respective type cases, means to produce a partial vacuum in such channels to advance the selected type therethrough, valves arranged in such channels to control the vacuum therein and operatively connected to said yoke whereby the partial vacuum is created only in the channel which is associated with type case in use at the time.

25. The combination of a passageway arranged to receive type, pneumatic means adapted to propel the type along the passageway, and a valve in said passageway arranged to be opened by the action of a type against it.

26. The combination of a type case having channels arranged to carry individual type, plunger mechanism actuated against the type to force the type from the type case, a passageway arranged to receive such ejected type, means to produce a partial vacuum in the passageway and a valve in said passageway arranged to be opened by the action of a type against it.

27. The combination of a pair of type cases having channels arranged to carry individual type, plunger mechanism actuated against the printing face of the type to force the type from the type cases, a pair of passageways one for each type case arranged to receive such ejected type, a common discharge passageway in communication with both of said first-named passageways, means to produce a pneumatic action in the passageways, and a valve in said common passageway arranged to be opened by the action of a type against it.

28. The combination of a type case having a plurality of type channels arranged to retain individual type, mechanisms for the respective channels arranged to eject the type therefrom, a type passageway common to all of said channels, a series of tubes intermediate the type channels and such passageway, such tubes arranged to receive ejected type, and pneumatic means for conveying the type through said tubes.

29. The combination of a type case having a plurality of type channels arranged to retain individual type, plunger mechanisms for the respective channels arranged to eject type therefrom, a type passageway common to all of said channels, a series of tubes intermediate the type channels and such passageway, such tubes arranged to receive ejected type and guide them to the type passageway, and means for partially exhausting the air from said tubes.

30. The combination of an upright type case having a plurality of type channels arranged to retain individual type on their sides, plunger mechanisms for the respective channels arranged to eject the bottom of the type therefrom, a substantially horizontally extending type passageway common to all of said channels, a series of tubes intermediate the type channels and such passageway, said tubes being arranged to receive ejected type and guide them to said passageway and at the same time turn them through an angle of substantially 90 degrees.

31. In a machine of the character described, a series of type storage channels arranged to contain individual type, plungers adapted to eject type from such channels, passageways arranged to receive said type, means to create a vacuum in such passageways, means including reciprocating valve members arranged to close the entrance of such passageways, lever mechanism arranged to operate the plungers, and linkage connected to such lever mechanism arranged to open the valve member to a passageway as the corresponding plunger is operated to eject a selected type.

32. In a type setting machine, a series of channels arranged to receive individual type, means to eject the bottom-most type from the channels, chambers arranged to receive such ejected type, a series of passageways in communication with respective chambers, an air compressor arranged to direct a blast of air into each chamber, a second series of passageways in communication with the respective chambers into which type passes from the chambers, means to cause a partial vacuum in said second named passageways, valve members arranged in the respective chambers to close both passageways, means operatively connected to the type ejecting mechanism to cause said valve members to be opened, thereby permitting the partial vacuum and compressed air to act upon an ejected type.

33. The combination of a type case provided with a plurality of substantially upright channels arranged to receive individual type, a shelf on which the bottom-most type in each channel rests, a series of plungers arranged to coact with respective channels and having passageways in their bottom faces, means to reciprocate such plungers across the shelf to eject type from the channel, means to cause compressed air to act against the type and wherein the passageways in the plungers are arranged to permit such compressed air to act against the same face of the type against which the plunger coacts.

34. A mechanism of the class described, comprising a pair of substantially parallel type cases each provided with a series of channels arranged to contain individual type, plungers arranged to eject the bottommost type from the channels, a series of pivoted levers for respective channels and arranged to reciprocate such plungers, a series of keys each key corresponding to one channel in each type case, a series of bell cranks operatively connected to said keys, a second series of bell cranks connected by links to respective bell cranks of the first named series, a shiftable yoke, a series of interponent members slidably carried in said yoke and pivotally secured to the second named bell cranks respectively, said interponents arranged to operate one set of plunger operating levers when the yoke is in another position, and means to shift the yoke from one position to the other.

35. The combination of a type case having channels for individual type, a substantially continuous passageway for the circulation of air currents, means to maintain the circulation of such air currents, means to eject type from the channels into the passageway, and means to remove the type from the passageway.

36. The combination of a type case, having channels for individual type, a substantially continuous passageway for the circulation of air currents, a pump interposed in such passageway to maintain the circulation of such air currents, and means to eject type from the channels into the passageway.

37. The combination of a type case having channels for individual type, a substantially continuous passageway for the circulation of air currents, a pump interposed in such passageway to maintain such circulation of air, means to eject type from the channels into such passageway, and a trap arranged to receive type drawn through the passageway.

38. The combination of a type case, having channels for individual type, a substantially continuous passageway for the circulation of air currents, means to maintain such circulation of air, means to eject type from the channels into such passageway, a trap arranged to receive type drawn through the passageway, and a valve in said trap adapted to be opened by the type.

39. In a type setting machine, a type case having channels for individual type, means to eject type from the channels, a substantially enclosed passageway arranged to receive the ejected type, a second enclosed passageway leading to the rear face of the ejected type, (relative to their direction of travel), and a pump arranged to withdraw air from the first named passageway and force it into the second named passageway and thereby convey the type to a point of discharge.

40. In a type setting machine, a type case having channels for individual type, means to eject type from the channels, a substantially enclosed passageway arranged to receive the ejected type, a second enclosed passageway leading to the rear face of the ejected type, (relative to their direction of travel), a pump arranged to withdraw air from the first named passageway and force it into the second named passageway and thereby convey the type to a point of discharge, and a trap in the first named passageway to receive the type therefrom.

41. The combination of a type case, a passageway adapted to receive type from the case, a vacuum chamber in communication with said passageway, and means for causing a partial vacuum in said chamber.

42. The combination of a type case, having channels for individual type, a passageway arranged to receive such type, a pump arranged to decrease the air pressure to progress type therethrough, means to eject selected type from the channels into such passageway, and a vacuum chamber communicating with said passageway and the pump, said vacuum chamber arranged to be constantly under the influence of a partial vacuum due to the influence of said pump.

43. The combination of a type case, having channels for individual type, a substantially continuous passageway for the circulation of air currents, a pump interposed in such passageway to maintain such circulation of air currents, means to eject selected type from the channels into such passageway, a vacuum chamber interposed in said passageway between the type ejecting means and the pump, and wherein said vacuum chamber is arranged to be constantly under the influence of a partial vacuum due to the action of said pump.

44. The combination of a type case having channels for individual type, a substantially continuous passageway for the circulation of air currents, a pump interposed in such passageway to maintain such circulation of air, means to eject type from the channels into such passageway, a vacuum chamber in said passageway arranged to be constantly under a partial vacuum due to the influence of said pump, and a trap to receive type from the passageway.

45. In a mechanism of the class described, a type bank comprising a series of channels arranged to contain individual type, a substantially enclosed conduit arranged to guide type from the channels to a point of discharge, means to eject type from the channels into said conduit, a hollow chamber through which said conduit passes, said conduit arranged to be in communication with said chamber but to prevent type from leaving the conduit while passing through the chamber, means for creating a partial vacuum in said chamber to draw the type through the conduit.

46. The combination with a type case comprising channels arranged to receive individual type of a substantially enclosed conduit arranged to guide type from the channels to a point of discharge, means to eject type from the channels into the conduit, a hollow chamber through which said conduit passes and arranged to communicate with the interior of the conduit, means for creating a partial vacuum in said chamber thereby drawing type through the conduit, wherein said conduit has a vertical portion within said chamber and extending through the bottom thereof, and a valve in said passageway below the chamber and arranged to be opened by the action of the descending type.

47. In combination with a type case, a delivery passageway adapted to receive type therefrom, means interposed in the passageway to arrest the movement of type, gripping means arranged to grip the type and forcibly draw it through said arresting means to the discharge point and means arranged to eject the type at the discharge point.

48. In combination with a type case provided with channels arranged to contain individual type, a series of type discharge passageways, a common type delivery passageway with which discharge passageways communicate, means to eject type from the type case to said discharge passageways, means to convey type through said delivery passageway, resilient means arranged to enter said delivery passageway and arrest the progress of type therethrough, a slide arranged for reciprocation parallel to the delivery passageway, a pair of levers pivoted intermediate their ends to said slide and arranged to enter slots in opposite sides of said delivery passageway, means to reciprocate said slide including a cam and a lever arranged to be oscillated by said cam to engage both of said first-named levers to cause the upper end thereof to grip the opposite sides of a type and forcibly draw it downwardly past said resilient means into the type discharging position.

49. In combination with a type case provided with channels arranged to contain individual type, a series of type discharge passageways, a common type delivery passageway with which the discharge passageways communicate, means to eject type from the type case to said discharge passageways, means to convey type through said delivery passageway, and means to grip the opposite sides of the type in the delivery passageway and advance the type.

50. In combination with a type case provided with channels arranged to contain individual type, a series of type discharge passageways, a common type delivery passageway with which discharge passageways communicate, means to eject type from the type case to said discharge passageways, means to convey type through said delivery passageway, resilient means arranged to enter said delivery passageway and arrest the progress of type therethrough, and means to grip the opposite sides of the type and move it past said resilient means.

51. In combination with a type case provided with channels arranged to contain individual type, a series of type discharge passageways, a common type delivery passageway with which discharge passageways communicate, means to eject type from the type case to said discharge passageways, means to convey type through said delivery passageway, means arranged to arrest the progress of type therethrough, a pair of levers adapted to grip the opposite sides of the type, and means for bodily moving the levers to move the type past said arresting means.

52. The combination of a type channel, a passageway, means for ejecting type from the channel into the passageway, and means for causing a partial vacuum in the passageway ahead of the type.

53. The combination of a type channel, a passageway leading from one end of the channel at an angle thereto, a plunger for ejecting type from the channel into the passageway, and pneumatic means for progressing the type along the passageway.

54. The combination of a gravitational type channel, a passageway leading from the lower end of the channel at an angle thereto, a plunger for ejecting type from the channel into the passageway, and means for causing a partial vacuum in the passageway ahead of the type.

55. The combination of a type channel, a type passageway, mechanism for ejecting type from the channel into the passageway, means for exhausting air from the passageway in advance of the type, and a valve adapted to shut off communication between the passageway and the type channel.

56. The combination of a type channel, a type passageway, means for exhausting air from the passageway in advance of the type, a valve adapted to shut off communication between the passageway and the type channel, and mechanism for concurrently causing ejection of the type from the type channel into the passageway and for withdrawing the valve.

57. The combination of a type channel, a type passageway, a plunger for ejecting type from the channel into the passageway, means for exhausting air from the passageway in avance of the type, a valve adapted to shut off communication between the passageway and the type channel, and mechanism for concurrently operating the plunger to eject the type from the type channel and for withdrawing the valve.

58. The combination of a type case having channels adapted to contain individual type, keyboard controlled means to eject selected type from the channels, a series of passageways leading from points adjacent the channels respectively, a series of plungers to eject type from the channels into the respective passageways, means to create a partial vacuum before such ejected type to carry them along the passageways, and a series of valves normally shutting off communication between the passageways and type channels.

59. The combination of a type case having channels adapted to contain individual type, means to eject such type from a channel into a discharge passageway constantly common to various channels, there being means to create a partial vacuum in such passageway before such ejected type and thereby progress it along the passageway.

60. The combination of a type case having channels adapted to contain individual type, of means to eject such type from the channels, a discharge passageway having a series of entrances from the channels respectively through which said type pass into the common passageway, and means to create a partial vacuum in such passageway before such ejected type and compressed air in such passageway behind the type.

61. The combination of a type case having channels adapted to contain individual type, keyboard-controlled means to eject selected type from any channel, a discharge passageway having a series of entrances through which the ejected type may pass into the passageway, and means to create a partial vacuum before such ejected type to carry them along the passageway.

62. The combination of a type case having channels adapted to contain individual type, of a keyboard-controlled means to eject selected type from the channels, a discharge passageway having a common portion and a series of individual mouths through which the ejected type may pass into the common portion of the passageway, means to create a partial vacuum before such ejected type and compressed air behind such type in the passageway.

63. The combination of a type case having gravitational channels adapted to contain individual type, key controlled plungers to eject type from the bottom of the channels into individual passageways communicating with a common discharge passageway, and pneumatic means for progressing each type along its individual passageway into the common passageway.

64. In a type setting machine, in combination, a type case, key-controlled plungers for ejecting the type from the case into individual passageways communicating with a common passageway, pneumatic means for transporting the ejected type along the respective individual passageway and then along the common passageway, and mechanical means for engaging the transported type and assembling them into a line.

PETER M. COLQUHOUN.